United States Patent
Kim et al.

(10) Patent No.: US 9,521,328 B2
(45) Date of Patent: Dec. 13, 2016

(54) MOBILE TERMINAL AND CONTROL METHOD FOR THE MOBILE TERMINAL

(71) Applicant: LG Electronics Inc., Seoul (KR)

(72) Inventors: Doohwan Kim, Seoul (KR); Byungju Kim, Seoul (KR); Raon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/457,607

(22) Filed: Aug. 12, 2014

(65) Prior Publication Data
US 2015/0085171 A1 Mar. 26, 2015

(30) Foreign Application Priority Data
Sep. 23, 2013 (KR) ........................ 10-2013-0112772

(51) Int. Cl.
*H04N 5/222* (2006.01)
*H04N 5/232* (2006.01)
(Continued)

(52) U.S. Cl.
CPC ........ *H04N 5/23293* (2013.01); *G02B 27/017* (2013.01); *H04N 1/00183* (2013.01); *H04N 1/00381* (2013.01); *H04N 1/00493* (2013.01); *H04N 1/00564* (2013.01); *H04N 1/212* (2013.01); *H04N 1/2125* (2013.01); *H04N 13/044* (2013.01); *G02B 2027/014* (2013.01); *G02B 2027/0123* (2013.01);
(Continued)

(58) Field of Classification Search
CPC H04N 5/23293; H04N 13/044; H04N 1/2125; H04N 1/00564; H04N 1/00183; H04N 1/00381;H04N 1/00493; H04N 1/212; H04N 2201/3273; H04N 2201/3267; H04N 2201/3245; G02B 27/017; G02B 2027/0123; G02B 2027/014
USPC ............................ 348/333.01–333, 222, 14
See application file for complete search history.

(56) References Cited

U.S. PATENT DOCUMENTS 8,223,088 B1 * 7/2012 Gomez ............... G06F 3/03547 345/7
2009/0244323 A1 10/2009 Carter et al.
(Continued)

FOREIGN PATENT DOCUMENTS

EP 1 898 634 A2 3/2008
GB 2465280 A 5/2010
(Continued)

*Primary Examiner* — Yogesh Aggarwal
(74) *Attorney, Agent, or Firm* — Birch, Stewart, Kolasch & Birch, LLP

(57) ABSTRACT

An image display device including a body configured to be wearable on a specific portion of a human body; a camera coupled to the body and configured to capture a video; a display unit coupled to the body and configured to display a preview screen for capturing the video; and a controller configured to receive a first input for setting a first region on the preview screen, display a first graphic object indicating the set first region on the display unit, capture the video for the first region according to a capture signal, and when a viewing angle of the preview screen including the set first region deviates more than a predetermined reference range, suspend capturing the video and display a second graphic object indicating an extent of the deviation.

20 Claims, 26 Drawing Sheets

(51) Int. Cl.
*H04N 1/00* (2006.01)
*H04N 1/21* (2006.01)
*H04N 13/04* (2006.01)
*G02B 27/01* (2006.01)

(52) U.S. Cl.
CPC ............... *G02B 2027/0138* (2013.01); *H04N 2201/325* (2013.01); *H04N 2201/3245* (2013.01); *H04N 2201/3253* (2013.01); *H04N 2201/3263* (2013.01); *H04N 2201/3267* (2013.01); *H04N 2201/3273* (2013.01)

(56) References Cited

U.S. PATENT DOCUMENTS

| | | | | |
|---|---|---|---|---|
| 2009/0268074 | A1* | 10/2009 | Sugino | H04N 5/23293 348/333.02 |
| 2010/0110368 | A1 | 5/2010 | Chaum | |
| 2012/0300051 | A1* | 11/2012 | Daigo | H04N 5/2258 348/77 |
| 2013/0038522 | A1 | 2/2013 | Nara et al. | |
| 2015/0169119 | A1* | 6/2015 | Kornmann | G06F 3/0412 345/173 |

FOREIGN PATENT DOCUMENTS

| | | | | |
|---|---|---|---|---|
| GB | 2494940 A | | 3/2013 | |
| GB | 2494940 A | * | 3/2013 | ........... G02B 27/017 |
| JP | 2007-129480 A | | 3/2008 | |
| WO | WO 2013/093906 A1 | | 6/2013 | |

\* cited by examiner

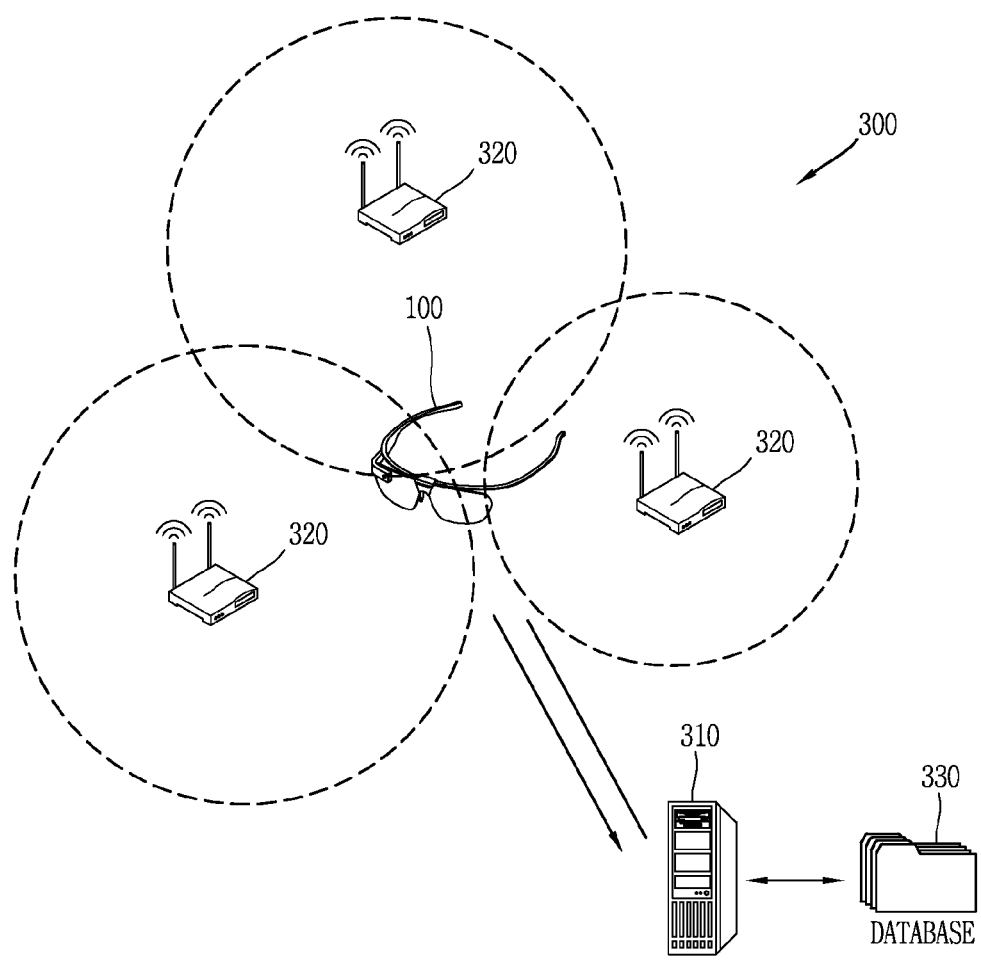

MOBILE TERMINAL AND CONTROL METHOD FOR THE MOBILE TERMINAL

CROSS-REFERENCE TO A RELATED APPLICATION

Pursuant to 35 U.S.C. §119(a), this application claims the benefit of earlier filing date and right of priority to Korean Application No. 10-2013-0112772, filed on Sep. 23, 2013, the contents of which is incorporated by reference herein in its entirety.

BACKGROUND OF THE INVENTION

1. Field of the Invention

The present invention relates to an image display device and a control method thereof, and more particularly, to an image display device formed to be wearable on a specific portion of a human body, and a control method thereof.

2. Description of the Related Art

With the rapid development of the information age, the importance of an image display device for implementing a realistic screen has been emphasized, and in recent years, an image display device configured to be wearable on a specific portion of a human body has drawn a lot of interest. A head mounted display (HMD) is such an example.

The HMD is mainly configured with safety glasses or a helmet-like device to allow a user to view a screen in front of his or her eyes, and developed to realize virtual reality. A scheme is typically used in which a small-sized display such as a liquid crystal display is provided at a position in close proximity to the binocular vision (both eyes) of the head mounted display to project an image, and various developments for space exploration, nuclear reactors, the use of military authorities and medial institutions, business and game purposes, and the like are currently being performed.

Owing to the developments, according to an embodiment of a head mounted display, smart glasses are being released in the market. Smart glasses implemented with a wearable device can execute a function that has been executed in the existing mobile terminal in a convenient manner.

For such a function, a user may wear smart glasses to capture video for external images shown through the smart glasses. At this time, due to the characteristics of smart glasses being moved along with the motion of the user, there is a restriction in which the user's head or line of sight should be fixed on a subject to be captured. Accordingly, it is required to seek ways to continuously capture a specific subject or region in a more convenient manner by taking restrictions such as a user's motion or change in line-of-sight while wearing smart glasses into consideration.

SUMMARY OF THE INVENTION

Thus, an aspect of the present invention is to provide an image display device and a control method thereof capable of continuously capturing a user's desired specific region or object through a display device configured to be wearable on a specific portion of a user body.

Furthermore, another aspect of the present invention is to provide an image display device and a control method thereof in which when a specific region or object desired to be captured is deviated from a view angle of a camera, the user can recognize it, and edit his or her desired scene based on the location information and time information of the existing specific region or object on the basis of the view angle subsequent to the termination of the capture.

Thus, an image display device according to an embodiment of the present invention may include a body configured to be wearable on a specific portion of a human body; a display unit coupled to the body to display a preview screen for video capture; a capture unit configured to sense an input for setting up a first region on the preview screen, and perform video capture for the first region according to a capture signal; and a controller configured to generate the capture signal, and display a first graphic object indicating the first region on the display unit, wherein when at least part of the first graphic object is deviated from a view angle of the capture unit by more than a reference range while performing video capture for the first region, the controller suspends video capture for the first region and displays a second graphic object indicating the extent of the first region being deviated from the view angle on the display unit.

According to an embodiment, when a predetermined closed curve shaped gesture input is sensed, the controller may control to set up the first region to correspond to the closed curve shape, and display the first graphic object corresponding to the closed curve shape on the display unit.

According to an embodiment, the controller may decrease a range of the first region for video capture in response to a gesture input for narrowing the boundary of the first graphic object in an inward direction, and increase a range of the first region for video capture in response to a gesture input for widening the boundary of the first graphic object in an outward direction, and change the first graphic object to correspond to the changed first region.

According to an embodiment, the controller may control to set up the first region when a zoom-in function is executed around the closed curve shape in response to sensing a gesture input for moving the closed curve shape to be away from the user, and set up the first region when a zoom-out function is executed around the closed curve shape in response to sensing a gesture input for moving the closed curve shape to be closer to the user.

According to an embodiment, when at least part of the first graphic object is deviated from the view angle by more than a reference range or disappears from the display unit, the controller may control to output a predetermined alarm.

According to an embodiment, when at least part of the first graphic object is deviated from the view angle by more than a reference range or disappears from the display unit, the controller may adjust the length and display direction of the second graphic object to correspond to the distance and direction of the first region being separated from the center of the view angle.

According to an embodiment, when at least part of the first graphic object is deviated from the view angle by more than a reference range or disappears from the display unit, the controller may change its mode to a video capture mode for the entire view angle or display a pop-up window for inquiring whether or not to suspend the video capture.

According to an embodiment, the controller may control to suspend video capture for the first region when a predetermined first gesture input is sensed, and maintain video capture for the first region when a predetermined gesture input is sensed when the pop-up window is displayed on the display unit.

According to an embodiment, the controller may control to resume video capture for the first region and allow the second graphic object to disappear from the display unit when the first graphic object corresponding to the first region is displayed again within the view angle when video capture for the first region is suspended.

According to an embodiment, the first region may be a specific region within the preview screen or a specific object contained in the preview screen.

According to an embodiment, when an input for setting up a second region is sensed when a first graphic object is displayed on the display unit, the controller may change video capture for the first region to video capture for the second region, and display a third graphic object indicating the second region on the display unit.

According to an embodiment, when the extent of widening the boundary of the first graphic object in an outward direction exceeds a predetermined reference value, the controller may change video capture for the first region to video capture for the entire view angle, and display an image corresponding to the change in one region of the display unit.

According to an embodiment, the controller may generate meta data containing at least one of whether or not the first region is contained within the view angle and location information thereof, time information corresponding to whether or not to capture video for the first region, and image quality information on the captured video image to store it in a memory during the video capture.

According to an embodiment, a touch sensor capable of sensing a touch input may be provided in one region of the body, and the controller may display a first image object corresponding to the stored meta data on the display unit and scroll the first image object along the direction of dragging a touch applied to the touch sensor when an edit function for the video capture is executed, and delete video images for a first region corresponding to a specific section when a gesture in a predetermined direction is entered to the specific section of the first image object.

According to an embodiment, the image display device may further include a wireless communication unit configured to transmit and receive a signal in connection with an external device, wherein the controller controls the wireless communication unit to display a representative image corresponding to at least one external device that is accessible to the body on the display unit when a multiple capture option for the first region is selected from the preview screen, and access the responding external device and transmit a control signal for performing video capture for the first region to the accessed external device when a response signal is received from an external device corresponding to one selected from the displayed representative images.

According to an embodiment, the controller may control the wireless communication unit to transmit a screen image corresponding to the first region and location information on the first region to the accessed external device, and receive a predetermined alarm from the accessed external device when at least part of the first region is deviated from a view angle of the accessed external device by more than a reference range.

According to an embodiment, when video capture for the first region is terminated, the controller may control the wireless communication unit to receive second meta data containing at least one of whether or not the first region is contained within the view angle of the accessed external device and location information thereof, time information corresponding to whether or not to capture video for the first region in the accessed external device, and image quality information on the captured video image in the accessed external device from the accessed external device.

According to an embodiment, a touch sensor capable of sensing a touch input may be provided in one region of the body, and the controller may display a first image object corresponding to first meta data generated from the body and a second image object corresponding to second meta data received from the accessed external device on the display unit and scroll either one of the first and the second image object along the direction of dragging a touch applied to the touch sensor when an edit function for the multiple capture is executed, and replace video images corresponding to the first image object corresponding to a specific section with video images corresponding to the specific section when a gesture in a predetermined direction is entered to the specific section of the second image object.

Furthermore, a method of operating an image display device according to an embodiment of the present invention, as an image display device configured to be wearable on a specific portion of a human body, may include displaying a preview screen for video capture on a display unit disposed to correspond to at least one of a user's both eyes; sensing an input for setting up a first region for video capture on the displayed preview screen; displaying a first graphic object indicating the first region on the display unit, and performing video capture for the first region according to a capture signal; and suspending video capture for the first region and displaying a second graphic object indicating the extent of the first region being deviated from a view angle on the display unit when at least part of the first graphic object is deviated from the view angle by more than a reference range while performing video capture for the first region.

According to an embodiment, the operation method may further include controlling to resume video capture for the first region and allow the second graphic object to disappear from the display unit when the first graphic object corresponding to the first region is displayed again within the view angle.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A and 2B are conceptual views illustrating a communication system through which an image display device according to the present invention is operable;

DETAILED DESCRIPTION OF THE INVENTION

Figure 1:
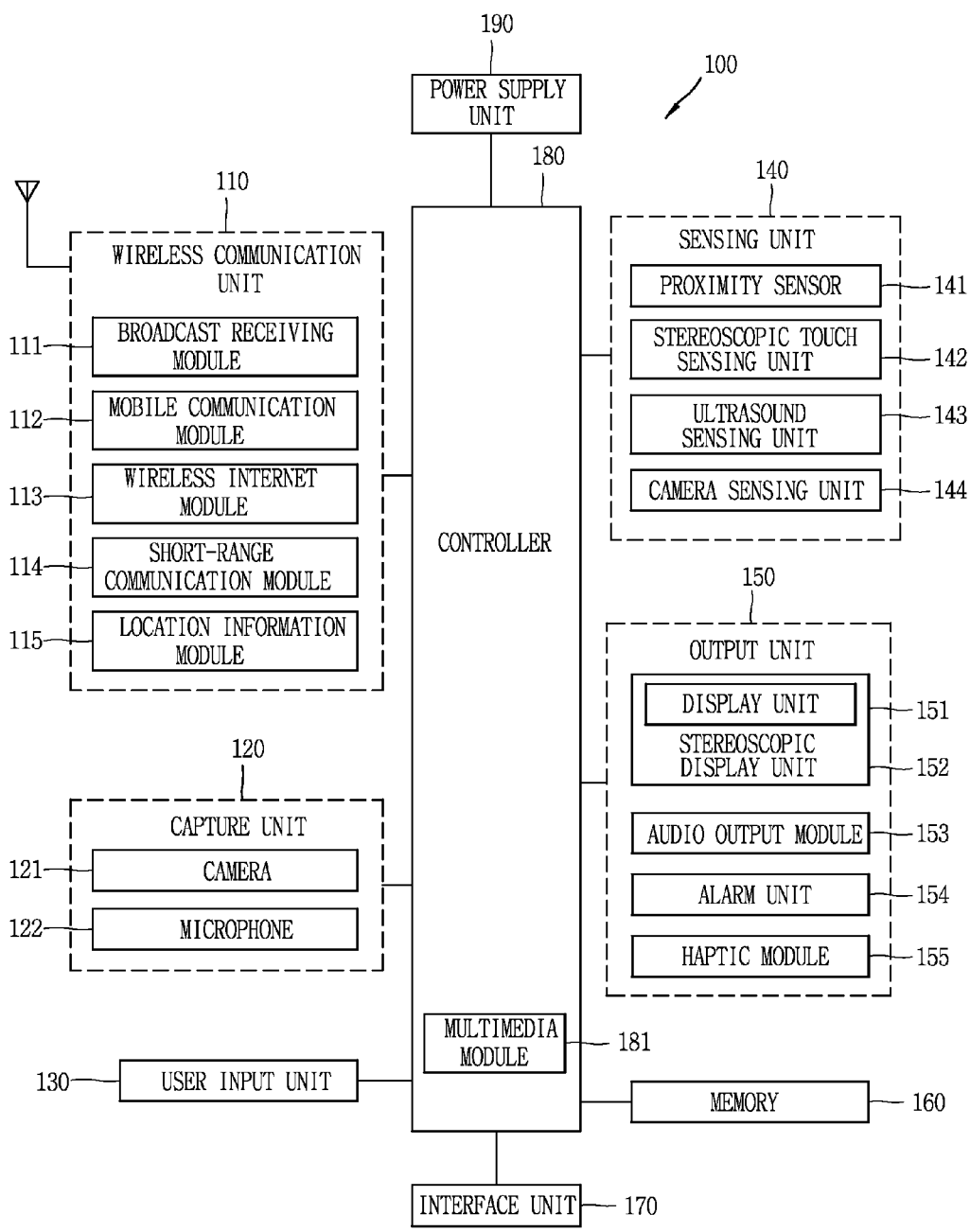
FIG. 1 is a block diagram illustrating an image display device according to an embodiment disclosed in the present invention.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. Also, it should be noted that the accompanying drawings are merely illustrated to easily explain the concept of the invention, and therefore, they should not be construed to limit the technological concept disclosed herein by the accompanying drawings.

FIG. 1 is a block diagram illustrating an image display device 100 according to an embodiment disclosed in the present invention. As shown, the image display device 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the image display device may be implemented with greater or less number of elements than those illustrated elements.

Hereinafter, the foregoing constituent elements will be described in sequence. The wireless communication unit 110 may include one or more modules allowing radio communication between the image display device 100 and a wireless communication system, or allowing radio communication between the image display device 100 and a network in which the image display device 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems. Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the image display device 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the image display device, and there is a Global Positioning Module (GPS) module or Wireless Fidelity (Wi-Fi) as a representative example.

Referring to FIG. 1, the capture unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. Furthermore, the microphone 122 signal-processes an external audio signal received while capturing video in a capture mode. The signal-processed voice data may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the image display device 100. The user input unit 130 may be configured by including a keypad, a dome switch, a touch pad (pressure/capacitance), a jog wheel, a jog switch, and the like.

The sensing unit 140 detects a current status of the image display device 100 such as an opened or closed configuration of the image display device 100, a location of the image display device 100, a presence or absence of user contact with the image display device 100, an orientation of the image display device 100, an acceleration/deceleration of the image display device 100, and the like, so as to generate a sensing signal for controlling the operation of the image display device 100. For example, when the image display device 100 is a slide phone type, the sensing unit 140 may sense whether a sliding portion of the image display device is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the image display device 100. For example, when the image display device 100 is in a phone call mode, the display unit 151 may display a User Interface (UI) or a Graphic User Interface (GUI) associated with a call. When the image display device 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display. Some of those displays may be configured with a transparent or optical transparent type to allow viewing of the exterior through the display unit, which may be called transparent displays. An example of the typical transparent displays may include a transparent LCD (TOLED), and the like.

Furthermore, the display unit 151 may be configured with a stereoscopic display unit 152 for displaying a stereoscopic image. Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. In addition, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

Furthermore, for 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit. The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. In addition, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 can sense which region of the display unit 151 has been touched.

Subsequently, referring to FIG. 1, a proximity sensor 141 may be arranged at an inner region of the image display device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this instance, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (for example, proximity touch distance, proximity touch direction, proximity touch speed, proximity touch time, proximity touch position, proximity touch moving status, etc.) Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, an ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The image display device may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Because light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor. For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

In another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the image display device 100 (e.g., sound alarming a call received or a message received, and so on). The audio output module 153 may include a receiver, a speaker, a buzzer, and so on.

The alarm 154 outputs signals notifying occurrence of events from the image display device 100. The events occurring from the image display device 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the image display device 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the image display device 100 may operate in association with a web storage which performs the storage function of the memory 160 on the Internet.

The interface unit 170 may generally be implemented to interface the image display device with external devices connected to the image display device 100. The interface unit 170 can allow a data reception from an external device, a power delivery to each component in the image display device 100, or a data transmission from the image display device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

Further, the identification module may be configured as a chip for storing various information required to authenticate an authority to use the image display device 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the image display device 100 via a port.

Furthermore, the interface unit 170 may serve as a path for power to be supplied from an external cradle to the image display device 100 when the image display device 100 is connected to the external cradle or as a path for transferring various command signals input from the cradle by a user to the image display device 100. Such various command signals or power input from the cradle may operate as signals for recognizing that the image display device 100 has accurately been mounted to the cradle.

The controller 180 typically controls the overall operations of the image display device 100. For example, the controller 180 performs the control and processing associated with telephony calls, data communications, video calls, and the like. The controller 180 can include a multimedia module 181 which provides multimedia playback. The multimedia module 181 may be configured as part of the controller 180 or as a separate component.

Furthermore, the controller 180 can perform a pattern recognition processing so as to recognize writing or drawing input performed on the touch screen as text or image. In addition, the controller 180 can implement a lock state for limiting the user's control command input to applications when the state of the mobile terminal satisfies a preset condition. Furthermore, the controller 180 can control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof. For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

Figure 2A:
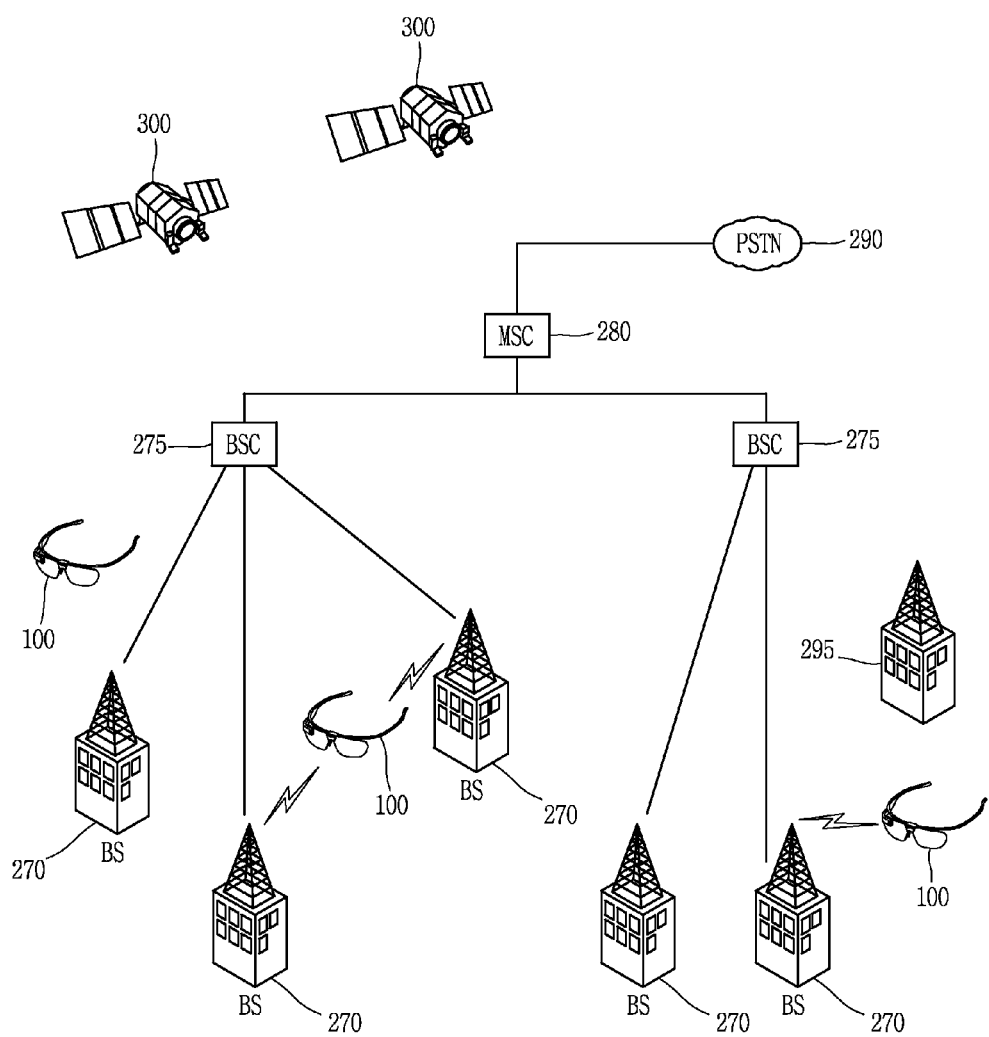

Next, a communication system that can be implemented through the image display device 100 according to the present invention will be described. FIGS. 2A and 2B are conceptual views illustrating a communication system in which an image display device 100 according to the present invention is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.)

The intersection of a sector and frequency assignment may be referred to as a CDMA channel. The BSs 270 may also be referred to as Base Station Transceiver Subsystems (BTSs). In this instance, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the terminals 100 being operated within the system. The broadcast receiving module 111 as illustrated in FIG. 1 may be provided in the image display device 100 to receive broadcast signals transmitted by the BT 295.

In addition, FIG. 2A illustrates several global positioning system (GPS) satellites 300. Such satellites 300 facilitate locating at least one of a plurality of terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various terminals 100. At this time, the terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the terminals 100.

Next, a method of acquiring the location information of a terminal using a Wi-Fi (Wireless Fidelity) positioning system (WPS) will be described with reference to FIG. 2B. The Wi-Fi positioning system (WPS) 300 refers to a location determination technology based on a wireless local area network (WLAN) using Wi-Fi as a technology for tracking the location of the image display device 100 using a Wi-Fi module provided in the image display device 100 and a wireless access point 320 for transmitting and receiving to and from the Wi-Fi module.

The Wi-Fi positioning system 300 may include a Wi-Fi location determination server 310, an image display device 100, a wireless access point (AP) 320 connected to the image display device 100, and a database 330 stored with any wireless AP information.

The Wi-Fi location determination server 310 extracts the information of the wireless AP 320 connected to the image display device 100 based on a location information request message (or signal) of the image display device 100. The information of the wireless AP 320 may be transmitted to the Wi-Fi location determination server 310 through the image display device 100 or transmitted to the Wi-Fi location determination server 310 from the wireless AP 320.

The information of the wireless AP extracted based on the location information request message of the image display device 100 may be at least one of MAC address, SSID, RSSI, channel information, privacy, network type, signal strength and noise strength.

The Wi-Fi location determination server 310 receives the information of the wireless AP 320 connected to the image display device 100 as described above, and compares the received wireless AP 320 information with information contained in the pre-established database 330 to extract (or analyze) the location information of the image display device 100.

On the other hand, referring to FIG. 2B, as an example, the wireless AP connected to the image display device 100 is illustrated as a first, a second, and a third wireless AP 320. However, the number of wireless APs connected to the image display device 100 may be changed in various ways according to a wireless communication environment in which the image display device 100 is located. When the image display device 100 is connected to at least one of wireless APs, the Wi-Fi positioning system 300 can track the location of the image display device 100.

Next, considering the database 330 stored with any wireless AP information in more detail, various information of any wireless APs disposed at different locations may be stored in the database 330. The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

Thus, any wireless AP information and location information corresponding to the any wireless AP are stored together in the database 330, and thus the Wi-Fi location determination server 310 may retrieve wireless AP information corresponding to the information of the wireless AP 320 connected to the image display device 100 from the database 330 to extract the location information matched to the searched wireless AP, thereby extracting the location information of the image display device 100.

Furthermore, such extracted location information of the image display device 100 may be transmitted to the image display device 100 through the Wi-Fi location determination server, thereby acquiring location information of the image display device 100.

Hereinafter, a structure of smart glasses will be described as an example of the image display device 100 that has been described in FIG. 1 or the image display device 100 in which constituent elements thereof are disposed. Further, smart glasses will be described as an example for the purpose of describing the image display device 100 according to an embodiment of the present invention. Accordingly, the image display device 100 and smart glasses can be used in a mixed manner.

Furthermore, the image display device 100 according to an embodiment of the present invention is not limited to smart glasses, and can be also implemented with a form to be wearable on a specific portion (for example, head, wrist, ear, shoulder, neck, cloth mounted type) of a user's body. Moreover, the image display device 100 according to an embodiment of the present invention may communicate with anther external device (for example, another image display device) using the wireless communication unit 110.

In addition, the another external device may be all electronic devices provided with a wireless communication unit, and the image display device 100 according to an embodiment of the present invention which is connected to an external device may be referred to as a "master image display device", and the connected another external device may be referred to as a "slave image display device".

Figure 3:
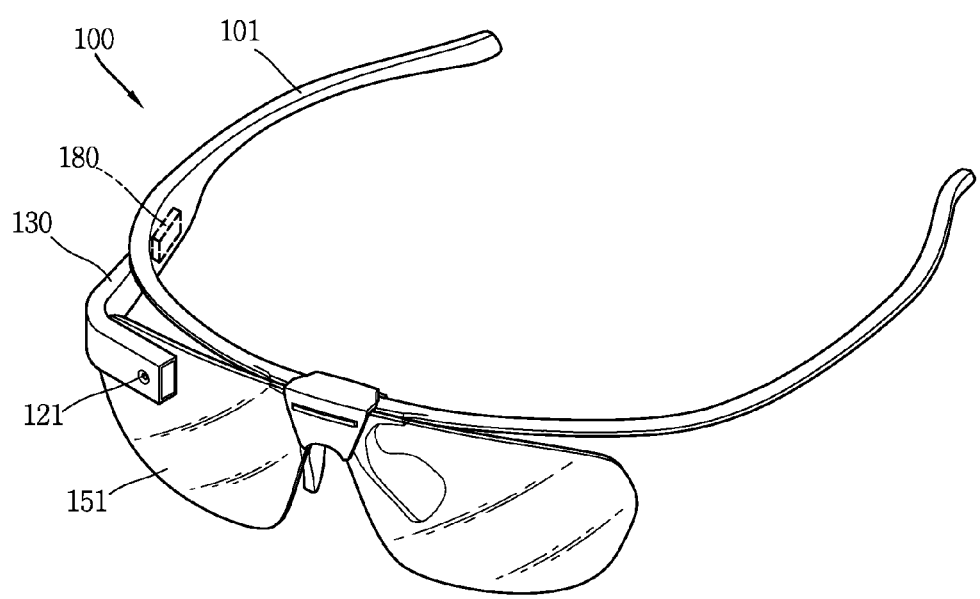
FIG. 3 is a conceptual view illustrating an image display device according to an embodiment of the present invention.

FIG. 3 is a conceptual view illustrating the image display device 100 according to an embodiment of the present invention, which is implemented as a head mounted display (HMD), and more particularly, a structure of smart glasses.

As illustrated in FIG. 3, the image display device 100 includes a body 101, a display unit 151 and a controller 180. Furthermore, according to the image display device 100, the user input unit 130 having a touch sensor is provided in one region thereof, and the camera 121 is disposed at a location corresponding to at least one of the user's both eyes.

The body 101 is formed to be wearable on a user's head. For example, the body 101 may be implemented as a frame and a bridge portion in smart glasses. Furthermore, the display unit 151 may be integrally incorporated into the body 101, and disposed at a location corresponding to at least one of the user's both eyes. The display unit 151 may also have a light transmittance, and visual information may be displayed on at least one of display units for both eyes.

In addition, the visual information denotes a virtual object generated from smart glasses or received from an external device. Furthermore, the virtual object may denote an application generated by the controller 180 or received from an external device or an icon, content, UI in a phone call mode and the like corresponding thereto.

The display unit 151 may have a light transmittance as described above, and thus the user can view an external environment as it is through the display unit 151. In other words, the display unit 151 may display an external environment shown through the display unit 151 along with visual information displayed on the display unit 151 (augmented reality). Therefore, the user can more easily know information on an arbitrary object constituting an external environment. IN a capture mode, an external environment being viewed through the display unit 151 may be a preview screen in the capture mode.

Furthermore, the display unit 151 may be implemented with a smart glass capable of changing a light transmittance thereof. Accordingly, the display unit 151 may change the light transmittance in a specific circumstance or condition. For example, when there is a worry that visual information is unrecognized or content requiring security is likely exposed to other persons as displaying an external environment shown through the display unit 151 along with visual information displayed on the display unit 151 (augmented reality), the transparency of the display unit 151 may be adjusted according to the user's manipulation to display visual information.

The camera 121 may be disposed on at least one front surface of the left and the right eye when there are provided a plurality of display units 151. Furthermore, the camera 121 may be disposed at an inner and an outer side of the body 101, respectively, to capture both a user's view and an external environment.

The user input unit 130 may be implemented by a touch sensor provided in one region of the frame of the body 101. Otherwise, it may be implemented with a physical key provided in the frame. For example, a power on/off switch may be provided at one position of the frame of the body 101.

When performing video capture while wearing the image display device 100 according to the present invention, there is inconvenience that the user should continuously fix a specific portion of a human body or his or her line of sight with respect to a specific region or object to continuously perform video capture around his or her desired specific region or object.

Accordingly, according to the embodiments of the present invention, when performing video capture on a user's desired specific region or object using smart glasses, it is implemented to continuously capture the relevant region or object even though the user's line of sight is changed once a designated specific region or object is located within a view angle of the camera.

Hereinafter, a method of operating an image display device associated with setting up a specific region for video capture and processing when the set specific region is deviated from a view angle of the camera will be described with reference to FIGS. 4, 5A and 5B.

Figure 4:
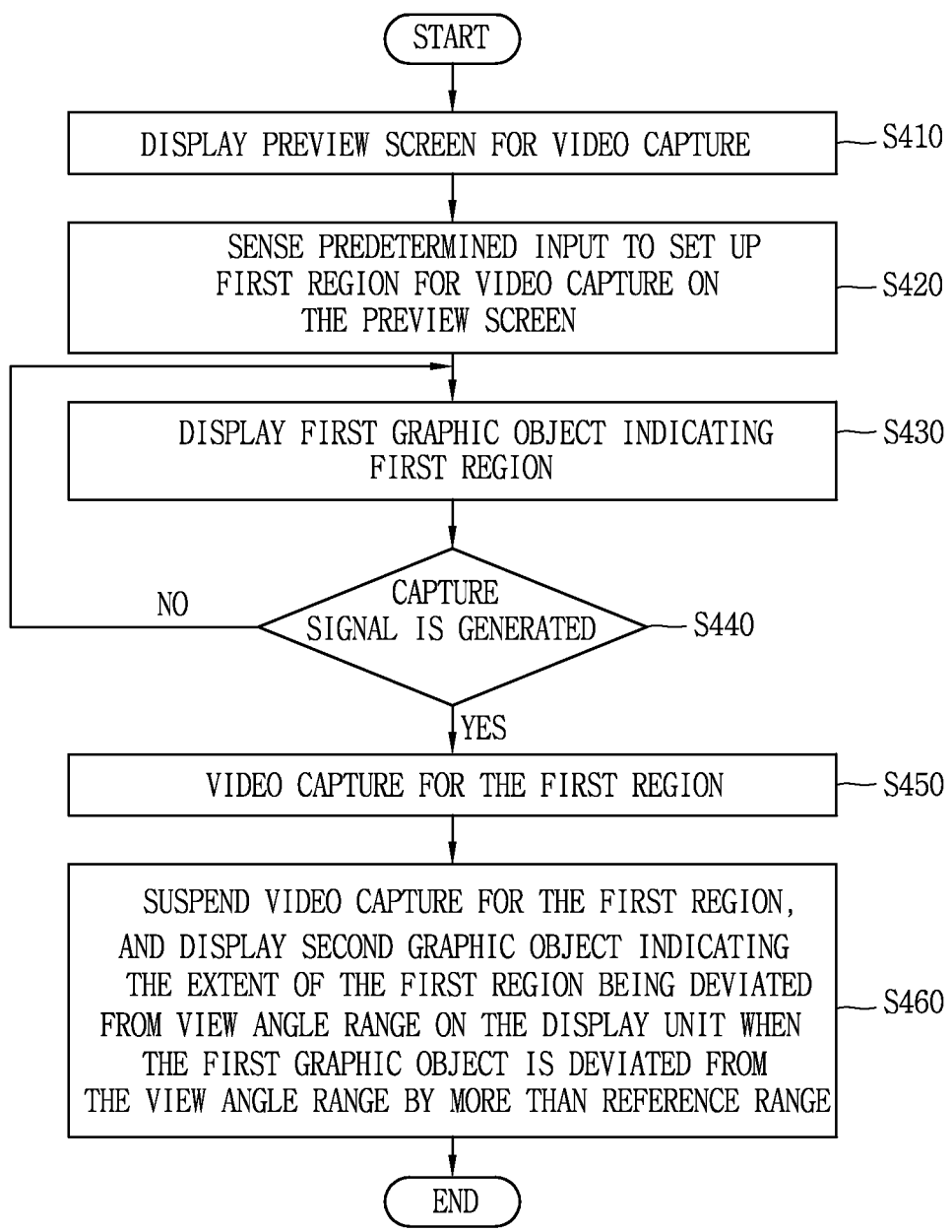
FIG. 4 is a flow chart illustrating a method of operating an image display device according to an embodiment of the present invention.
Figure 5A:
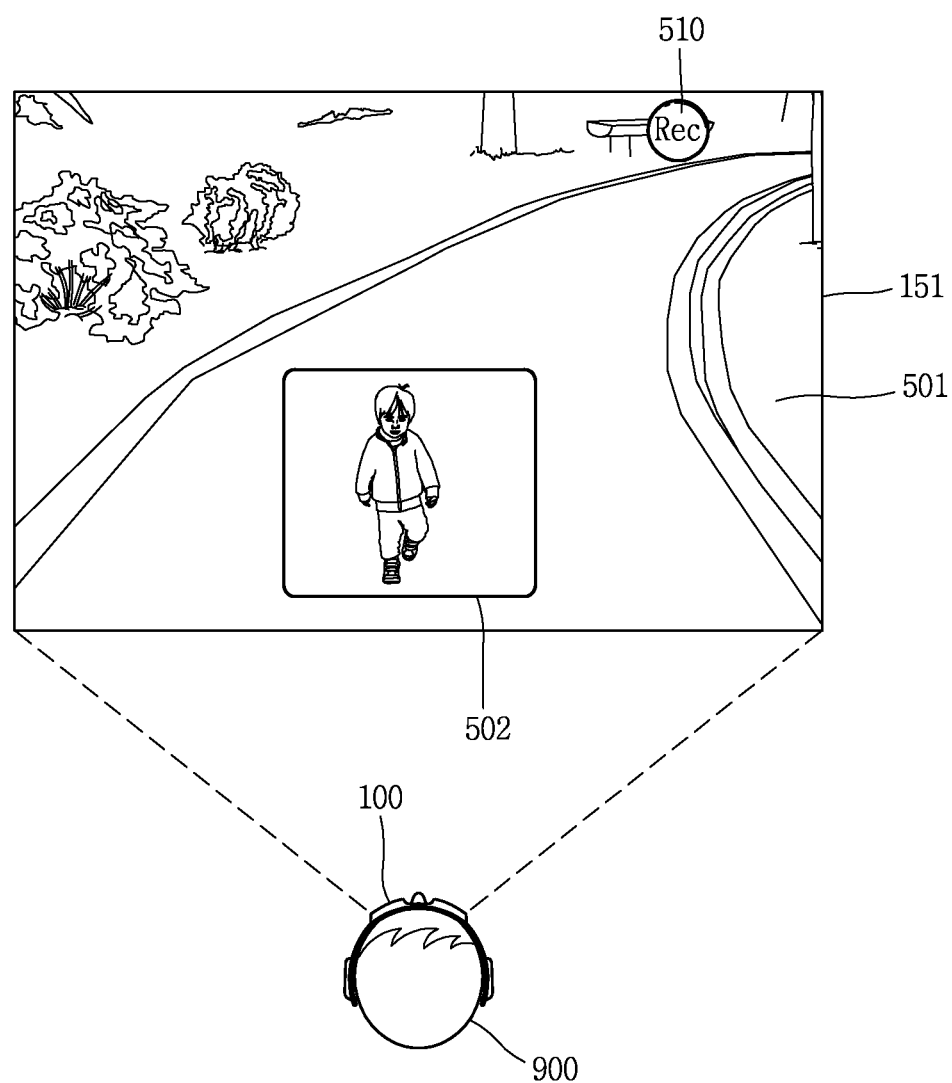
FIGS. 5A and 5B are conceptual views illustrating a flow chart in FIG. 4.
Figure 5B:
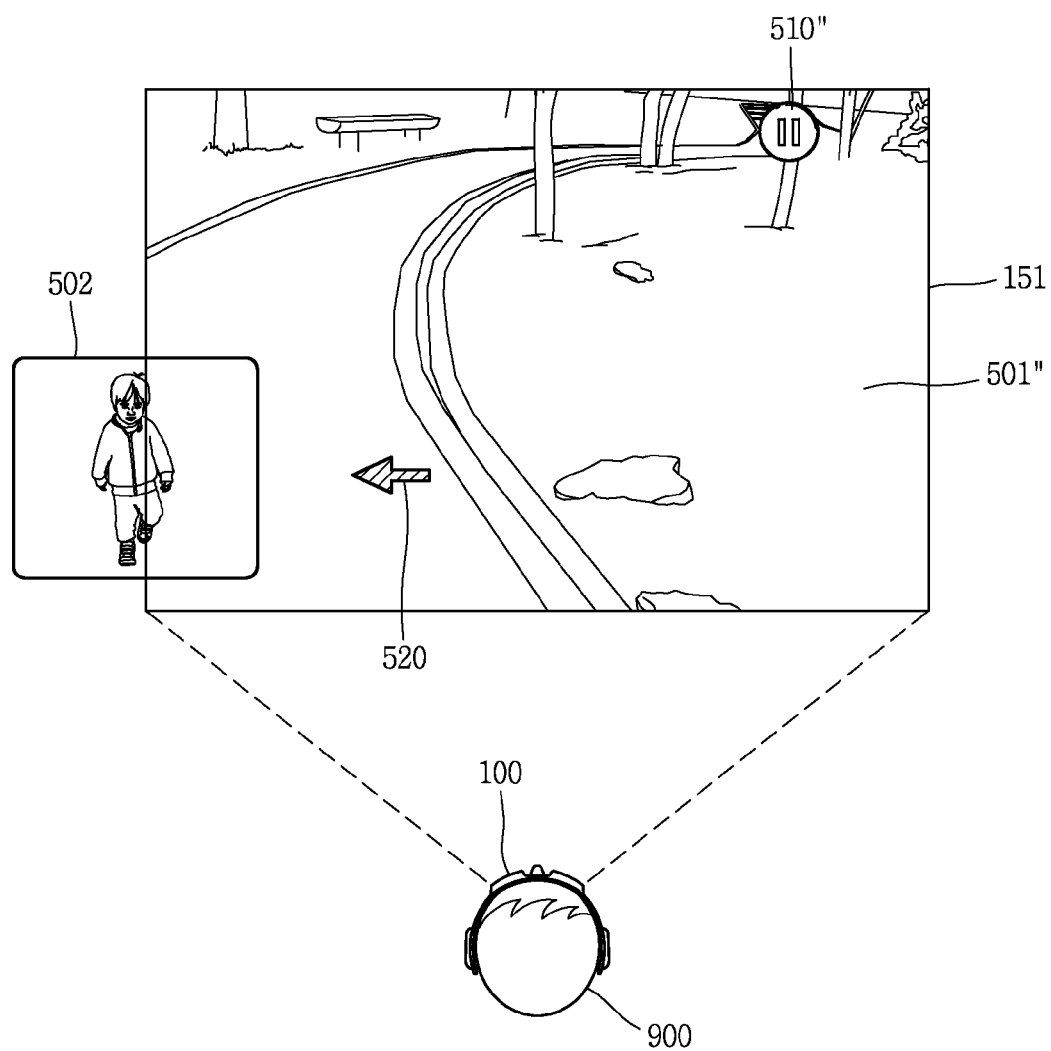

In particular, FIG. 4 is a flow chart illustrating a method of operating an image display device according to an embodiment of the present invention, and FIGS. 5A and 5B are conceptual views illustrating a flow chart in FIG. 4.

Referring to FIG. 4, first, the image display device 100 according to the present invention displays a preview screen for video capture on the display unit 151 disposed to correspond to at least one of the user's both eyes (S410).

In addition, the preview screen may be displayed on the display unit 151 when the user manipulates a menu of the image display device 100 to enter a capture mode. Furthermore, the preview screen may be an image of an external environment shown through the display unit 151 having a light transmittance due to the characteristics of smart glasses. In this instance, the controller 180 can recognize a state of the preview screen being displayed even prior to entering the capture mode, namely, even in an idle state or lock screen state.

Furthermore, the preview screen may be the play screen of an image received from an external device or prestored in the image display device 100. In this instance, it is possible to set up a specific region for video capture as described below from an image reproduced on the display unit 151.

When a preview screen is displayed as described above, the capture unit 120 of the image display device 100 senses a predetermined user input for setting up a first region for video capture (S420). In addition, a user input for setting up a first region may be a predetermined gesture shape or user's setup gesture. For example, a gesture input for setting up a first region for video capture may be a hand operation indicating a frame shape or an operation for drawing a closed curve shape to correspond to the first region.

Otherwise, a user input for setting up the first region may be performed by pushing a specific key provided in the image display device 100 or performing a predetermined voice command (but may not be limited to this). For an example, when such a gesture input is sensed, the output of a preview screen corresponding to a capture mode along with the setup of the first region may be performed at the same time.

Furthermore, the first region may denote a specific region (for example, a specific sign, a soccer goalpost) within the preview screen, or denote a specific object (for example, a moving object, such as a person, an animal, a plane, etc.) within the preview screen. Though coordinate information for a specific region may be acquired based on a view angle of the camera when the former, the recognition process and extraction process of a specific object should be performed at the same time in consideration of the mobility of the specific object when the latter.

When a first region for video capture is set up, the controller 180 displays a first graphic object indicating a first region on the display unit 151 (S430). In addition, the first graphic object may be an image containing the location and size information of a first region. For example, the first graphic object may be a frame image drawn on at least one boundary of the first region. Furthermore, the location of the first graphic object displayed on the display unit 151 may be changed according to the first region being moved or the view angle of the camera 121 being changed.

When a capture signal is applied when the first graphic object corresponding to the first region is displayed (S440), the controller 180 performs video capture for the first region (S450). In addition, the capture signal may include any type of input recognized as a control command for starting video capture when the first region is set up. For example, the capture signal may be implemented by any one of a user's voice command (for example, shouting "capture"), a touch input applied to the body 101, a control menu manipulation shown through the display unit 151, and a predetermined gesture operation. Furthermore, a display corresponding to a capture signal or capture end signal may be displayed on the display unit 151.

In addition, video capture for the first region denotes capturing only a portion corresponding to the first region set up at the entire view angle. Such a partial capture mode is distinguished from an entire capture mode for capturing the entire view angle. When starting video capture for the first region as described above, a display visually distinguished from the entire video capture may be displayed in one region of the display unit 151.

For example, referring to FIG. 5A, a user wearing the image display device 100 may set up a desired subject (for example, a child) for video capture from an external environmental image 501 shown through the display unit 151 through a predetermined gesture input. At this time, a predetermined frame 502 is displayed around the set subject, and when capture for the set subject is started, an indicator 510 (for example, REC display indicating "being captured") indicating a capture state is displayed in one region of the display unit 151, for example, at an upper end thereof. Furthermore, the image display device 100 continuously captures only images within the frame 502.

While continuing video capture for the first region, the controller 180 monitors whether or not at least part of the first graphic object is deviated from the view angle by a reference range. As a result of the monitoring, when at least part of the first graphic object is deviated from a view angle of the camera or disappears from the display unit 151, the controller 180 suspends video capture for the first region and displays a second graphic object indicating the extent of the first region being deviated from the view angle on the display unit 151 (S460).

Accordingly, the user can recognize a current location of the first region according to a direction indicated by the second graphic object. Thus, when a second graphic object is displayed on the display unit 151, the user may determine whether or not to continue video capture for the first region. Specifically, the user may move the view angle of the camera 121 in a direction indicated by the second graphic object if he or she wants to continue video capture for the first region, and maintain a current state or freely move the camera 121 when he or she wants to pause video capture for the first region.

For example, referring to FIG. 5B, when most of the set subject is deviated from the view angle including the external environmental image 501", namely, when the extent of the frame 502 disappearing from the display unit 151 exceeds a predetermined reference range (for example, above 40-50%), video capture for the subject is paused 510", and a direction indicator 520 indicating a current location of the subject is displayed at the center of the display unit 151.

The user wearing the image display device 100 can thus recognize a current location of the subject through the displayed indicator 520. Furthermore, the user may slightly rotate his or her head in a direction indicated by the indicator 520 to resume capture for the subject or maintain the current state to continue a capture suspend state.

As described above, the image display device 100 according to the present invention may provide a user interface (UI) to allow a user to conveniently set up his or her desired specific region or object for video capture, and continuously capture his or her desired scene regardless of the user's motion or change in line-of-sight once the set specific region or object is contained in the view angle of the camera, thereby providing a user convenient environment.

Hereinafter, specific examples of a method of setting up a first region for video capture will be described in connection with the step (S420) of FIG. 4. In this context, FIGS. 6A through 6F are conceptual views illustrating a method of setting up a region for video capture in the image display device 100 according to the embodiments of the present invention.

Figure 6A:
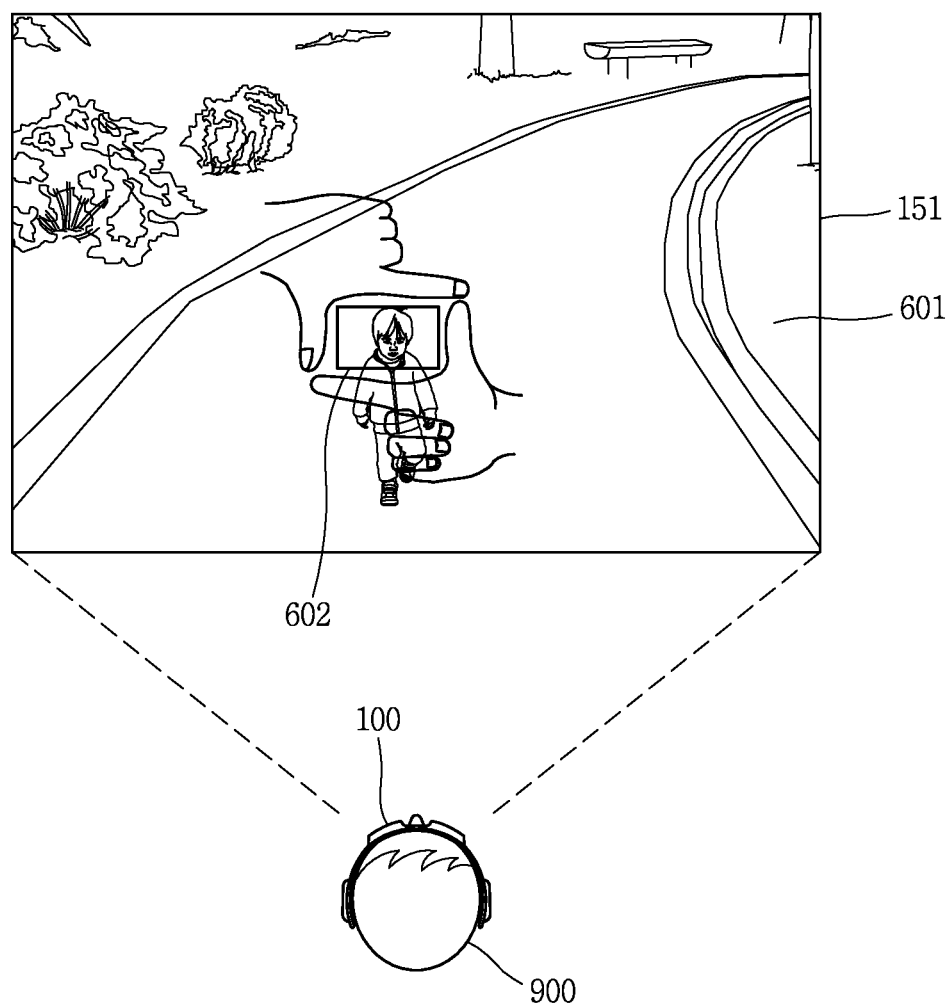
FIGS. 6A through 6F are conceptual views illustrating a method of setting up a region for video capture in an image display device according to the embodiments of the present invention.

A gesture input for setting up a user desired first region when a preview screen 601 is displayed on the display unit 151 may be implemented in various ways. For example, the gesture input may be a hand gesture input with a closed curve shape, more particularly, a frame shape, containing a region desired for capture or a subject 602 as illustrated in FIG. 6A.

Thus, a predetermined closed curve shaped gesture input may be sensed through the camera 121. When a predetermined closed curve shaped gesture input is sensed, the controller 180 can set up a first region to correspond to the sensed closed curve shape, and display a first graphic object corresponding to the closed curve shape on the display unit 151.

Figure 6B:
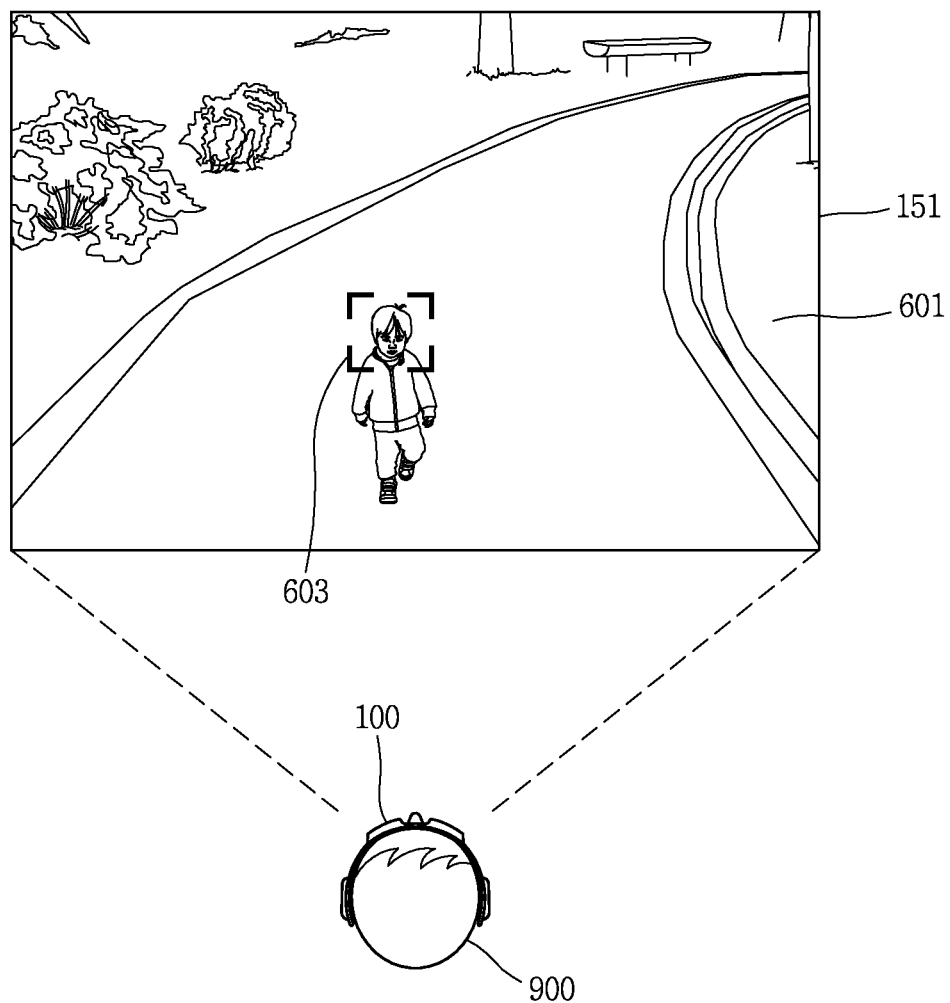

The first graphic object may be a frame image 603 using a finger indicating the closed curve shape as a boundary as illustrated in FIG. 6B. In this instance, when a capture signal is applied, the camera 121 captures only an object or image displayed within the frame image 603.

Further, a gesture input for setting up a first region may be implemented with a predetermined proximity touch on a virtual image shown through the display unit 151 or a gesture for moving a proximity touch in a predetermined direction in addition to a gesture indicating a closed curve shape. In this instance, the controller 180 can change a specific region or object for video capture to a region or object corresponding to a position to which the touch is moved in response to a touch applied to the first graphic object being moved to another region when the first graphic object is displayed.

Furthermore, the user may adjust the size of a setup region or zoom in or out an image contained in the set region based on a predetermined gesture input. Specifically, the controller 180 can decrease a range of the first region for video capture in response to a gesture input for narrowing the boundary of the first graphic object corresponding to the first region in an inward direction, Furthermore, the controller 180 can increase a range of the first region for video capture in response to a gesture input for widening the boundary of the first graphic object corresponding to the first region in an outward direction.

Figure 6C:
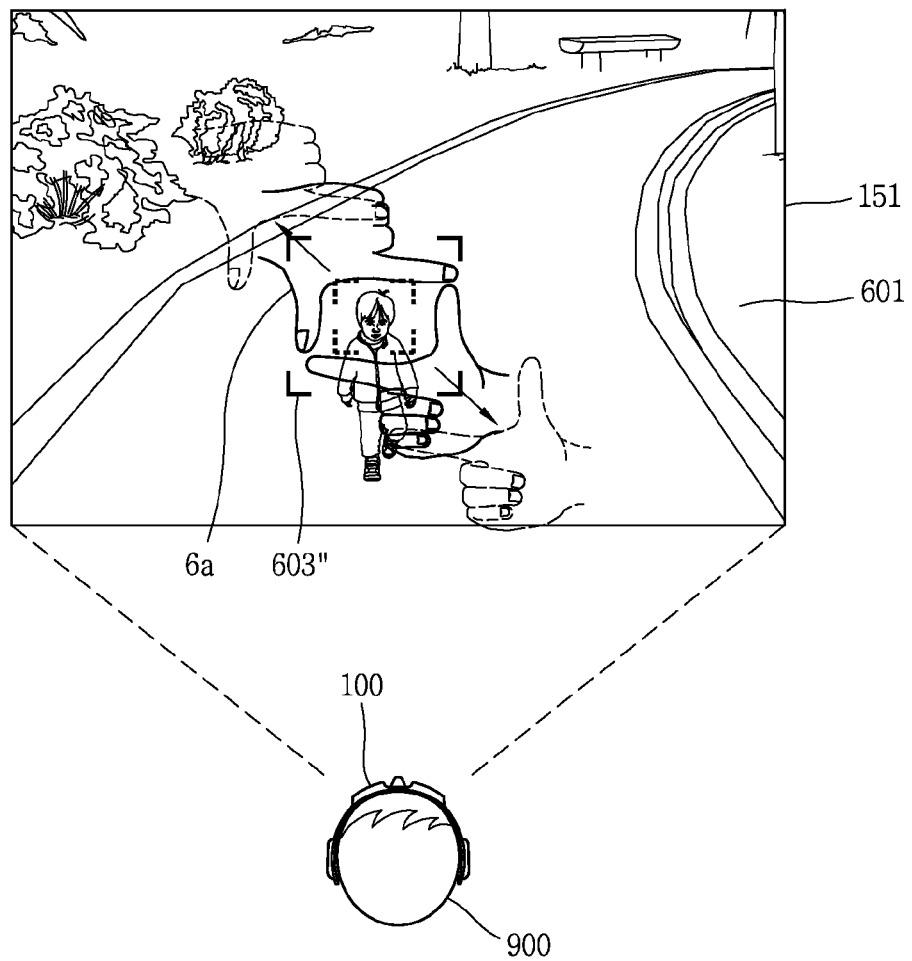

Thus, when increasing the range (or size) of the first region, the controller 180 changes and displays the shape of a first graphic object displayed on the display unit 151 to correspond to the changed first region. For example, as illustrated in FIG. 6C, the size of the first region is increased according to the extent of pulling the frame image 603" or being away from the center in response to the user performing a gesture in one direction (6a), for example, pulling the frame image 603" corresponding to the first region displayed on the display unit 151 in an outward direction or being away from the center.

On the contrary, when the user performs a gesture in an opposite direction, for example, pushing the frame image 603" in an inward direction or being close to the center, the size of the first region is decreased according to the extent of pushing the frame image 603" or being close to the center. Thus, the size of the first region is gradually adjusted according to the extent of pulling the boundary of the frame image 603" in an outward direction or pushing it in an inward direction.

When the extent of pulling the frame image 603" in an outward direction exceeds a reference range (for example, view angle), the setup of the first region is cancelled and changed to a video capture mode for the entire view angle. In other words, when the extent of widening the boundary of the first graphic object in an outward direction exceeds a predetermined reference value, the controller 180 can change video capture for the first region to video capture for the entire view angle. Furthermore, an image (for example, a display indicating an entire capture mode) corresponding to the change may be displayed in one region of the display unit 151.

Figure 6D:
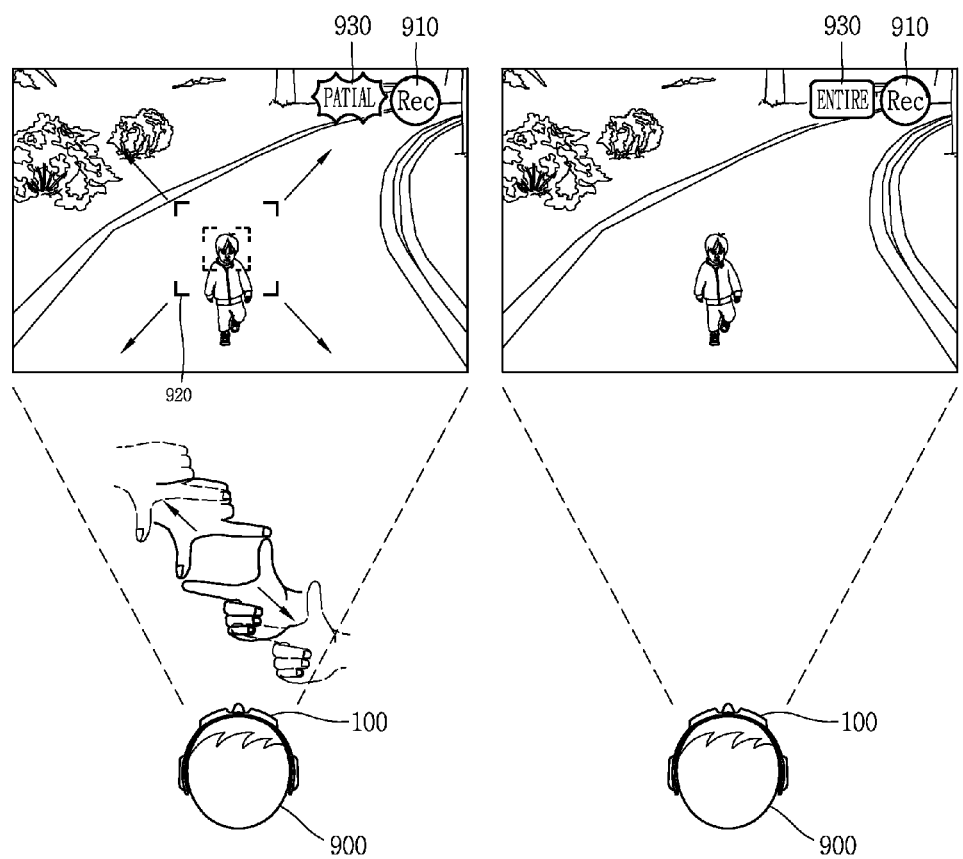

For example, as illustrated in FIG. 6D, even while performing video capture for the first region, when the user heavily pulls a frame image 920 corresponding to the first region in an outward direction, a partial capture mode 930 is changed to an entire capture mode 930". Accordingly, the frame image 920 corresponding to the first region disappears from the screen.

Furthermore, the controller 180 can sense a gesture input in which a closed curve shape corresponding to the first region is moved to be away from the user through the camera 121. Upon sensing such a gesture input, the controller 180 can recognize it as a control command for executing a zoom-in function around an image shown within the closed curve shape, thereby setting up a first region when the zoom-in function is executed around the closed curve shape.

On the contrary, upon sensing a gesture input in which a closed curve shape corresponding to the first region is moved to be close to the user through the camera 121, the controller 180 can control to set up a first region when a zoom-out function is executed around the closed curve shape.

Figure 6E:
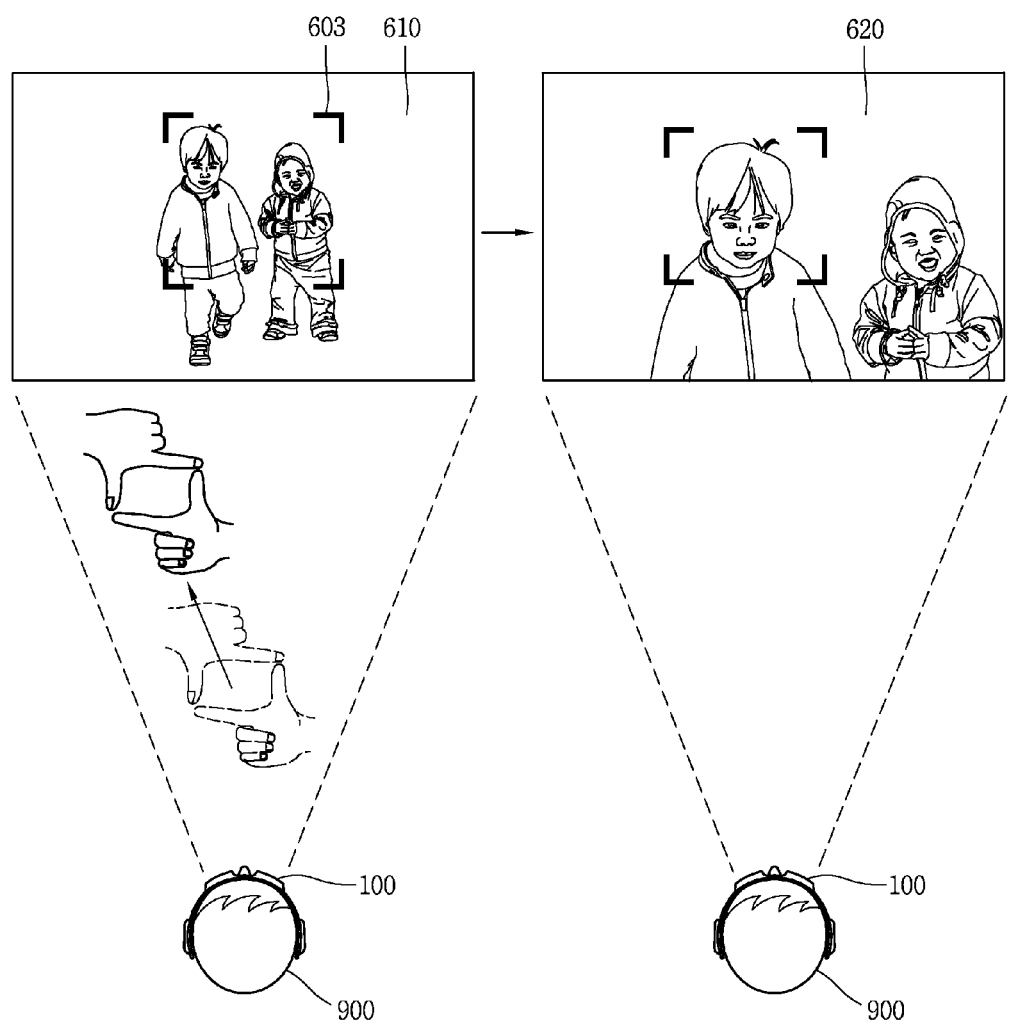

In addition, a screen enlargement/reduction range corresponding to the zoom-in/out function in may be differently adjusted according to the extent of the gesture input being away from or close to the user. For example, as illustrated in FIG. 6E, when a user wearing the image display device 100 moves a predetermined gesture shape, for example, a frame shaped hand gesture, to be away from himself or herself or close to the capture screen, video capture is performed when a zoom-in function is executed on the basis of the displayed frame image 603.

Figure 6F:
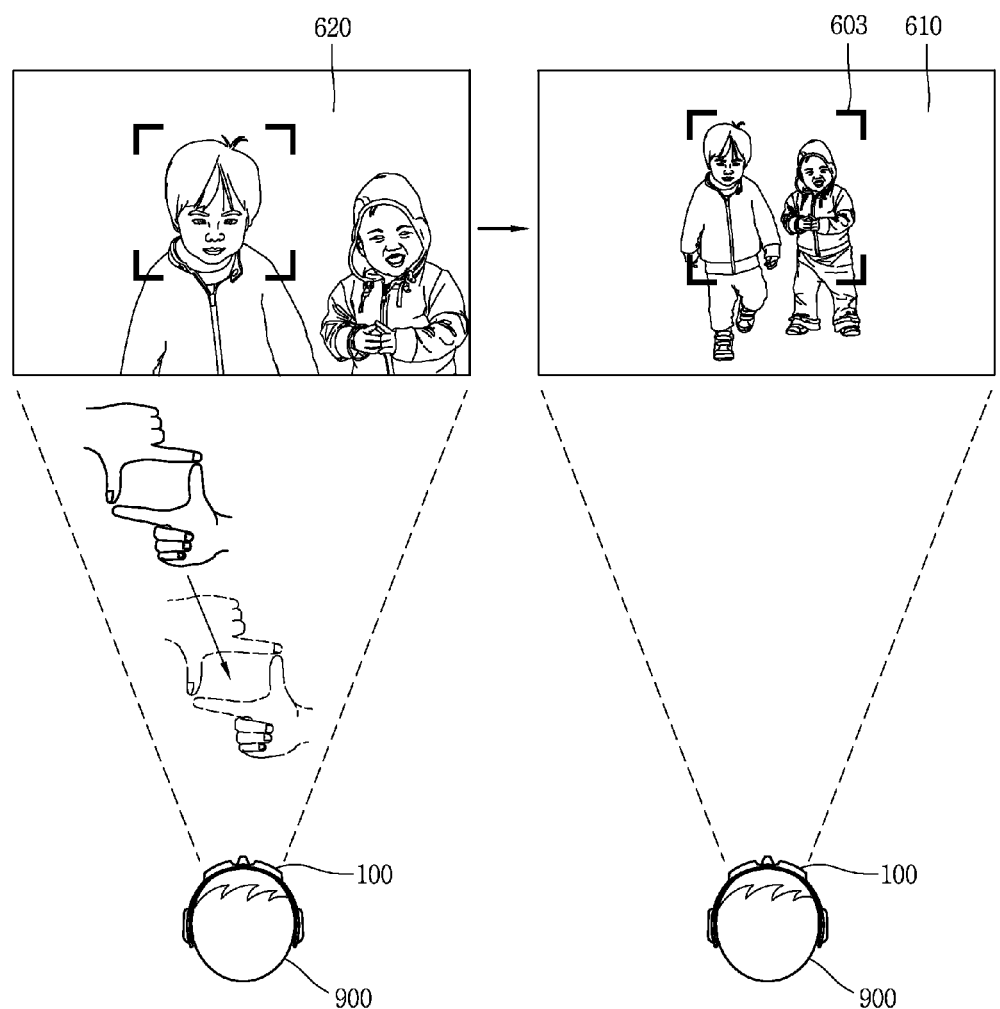

On the contrary, as illustrated in FIG. 6F, when the user moves a predetermined gesture shape, for example, a frame shaped hand gesture, to be close to himself or herself or away from the capture screen, video capture is performed when a zoom-out function is executed on the basis of the displayed frame image 603. Furthermore, ] when exceeding a predetermined period of time has passed while the user maintains a frame shaped hand gesture, a zoom-in function for the relevant region may be executed in a navigation manner (i.e., increasing the level in stages).

Hereinafter, specific examples of a method of processing video capture for a first region when a first graphic object corresponding to the set first region is deviated from a view angle of the camera will be described in connection with the step (S460) of FIG. 4. In particular, FIGS. 7A through 7D are conceptual views illustrating a processing method when a set region is deviated from a view angle in an image display device according to the examples of the present invention.

When at least part of the first graphic object corresponding to the set first region is deviated from the view angle by more than a reference range or disappears from the display unit, the controller 180 can output a predetermined alarm (for example, notification sound, highlighting effect, transparency control, popup message display, etc.) Accordingly, the user can recognize that video capture for the first region is not normally performed.

Thus, when at least part of the first graphic object disappears from the view angle, the controller 180 suspends video capture for the first region and displays a second graphic object indicating the extent of the first region being separated from the view angle on the display unit 151.

Figure 7A:
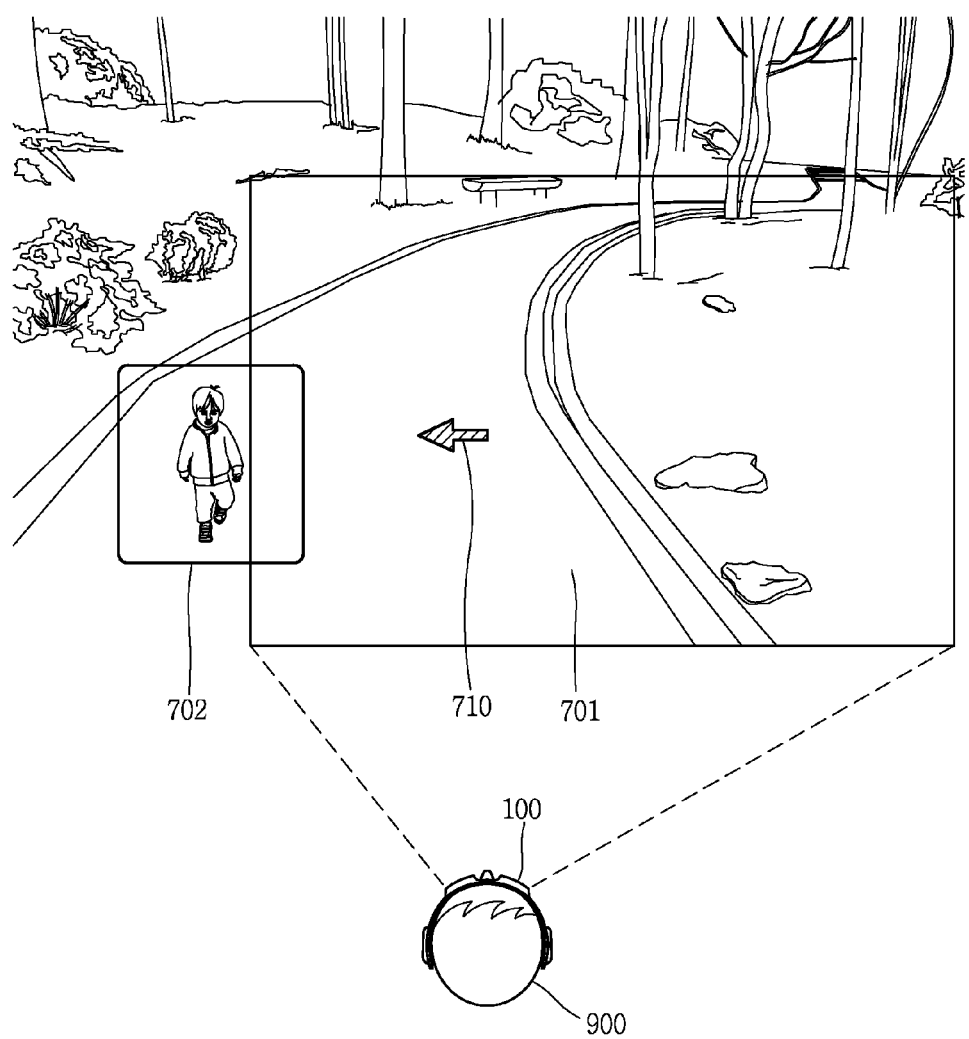
FIGS. 7A through 7D are conceptual views illustrating a processing method when a set region is deviated from a view angle in an image display device according to the examples of the present invention.

For example, as illustrated in FIG. 7A, when the frame image 702 corresponding to a user's setup subject is deviated from the view angle by more than a reference range (for example, above 50%) from a viewing image 701, an arrow shape 710 indicating a current location of the subject corresponding to the frame image 702 is displayed at the center of the display unit 151.

Figure 7B:
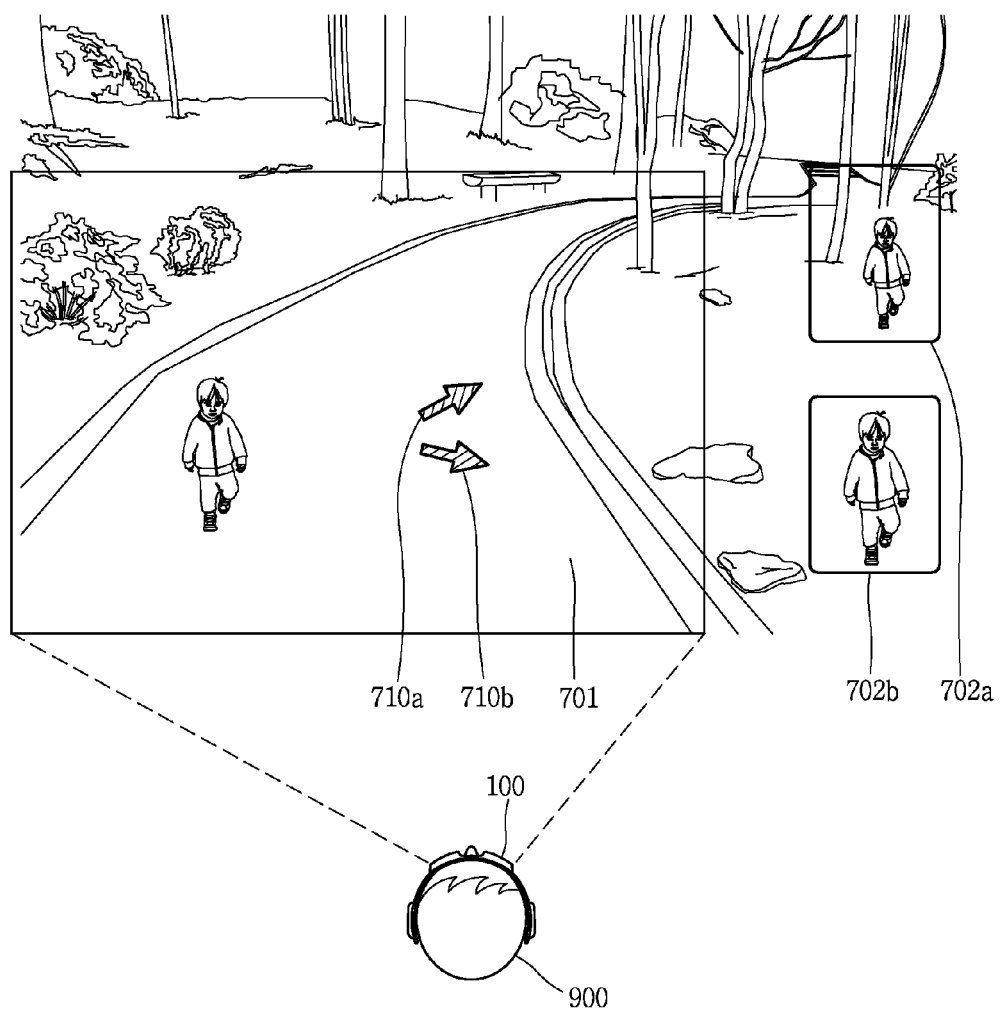

Meanwhile, a user's setup subject is moved out of the view angle, an arrow shape indicating a position to which the subject is moved is displayed even without the movement of the view angle. For example, as shown in FIG. 7B, when the subject is moved to a first position 702*a* out of the view angle, a first arrow shape 710*a* indicating the first position is displayed on the display unit 151. Furthermore, when the subject is moved to a second position 702*b* out of the view angle, a second arrow shape 710*b* indicating the second position is displayed on the display unit 151.

In addition, the second graphic object may include direction information and distance information indicating a current location of the first region. In this instance, the controller 180 adjusts and displays the length and display direction of a second graphic object such that the first region corresponds to a distance and direction separated from the center of the image view angle.

Figure 7C:
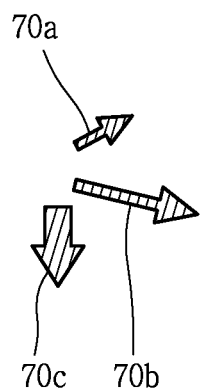

For example, referring to FIG. 7C, when the second graphic object is an arrow shaped image, a direction indicated by the head of the arrow shape indicates a direction in which the first region is located. Furthermore, a short length of arrow (70*a*) denotes that the first region is located nearby, and a long length of arrow (70*b*) denotes that the first region is located far away. Furthermore, the thickness of the arrow may be differently displayed according to the size of the first region (70*c*). Meanwhile, the second graphic object may be displayed with another image (for example, an image with a rotating hand shape) or text (for example, text containing location information for the first region).

Thus, the extent and direction of the first region separated from the view angle is displayed on the display unit 151, thereby guiding the direction or extent to be moved by the user. Further, when at least part of the first graphic object corresponding to the set first region disappears from the view angle, video capture for the first region is suspended.

Figure 7D:
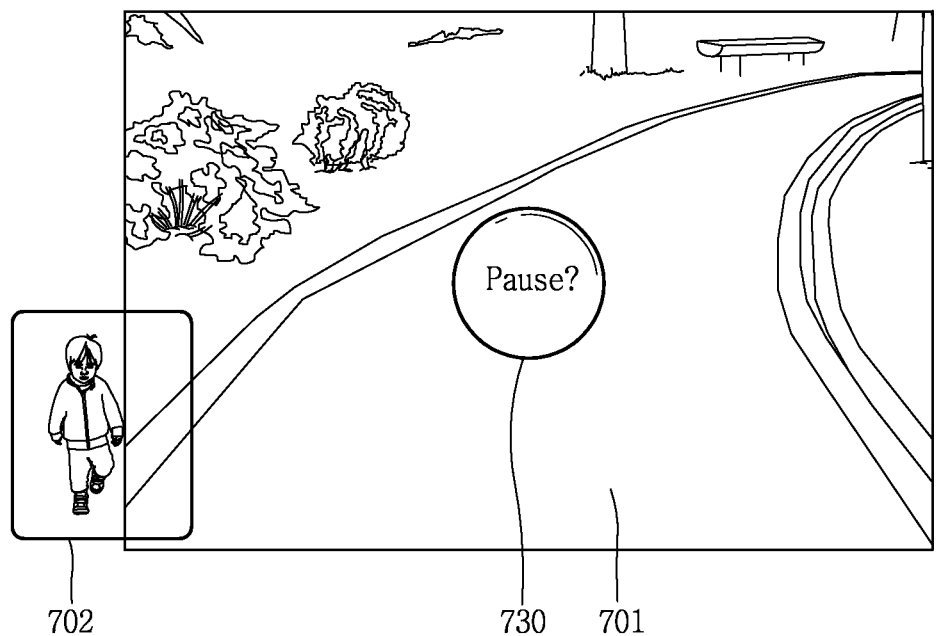

In this instance, the controller 180 can change video capture for the first region to video capture for the entire view angle. Otherwise, the controller 180 can display a predetermined popup window for inquiring whether or not to suspend video capture for the first region (for example, popup window containing a pause message) in one region of the display unit 151, for example, at the center thereof, as illustrated in FIG. 7D. Furthermore, at the same time, the luminance (for example, dark) of the screen displayed on the display unit 151 may be adjusted.

Upon sensing a predetermined first gesture input (for example, nodding head operation) when the foregoing popup window is displayed on the display unit 151, the controller 180 can suspend (pause) video capture for the first region. Furthermore, upon sensing a predetermined second gesture input (for example, shaking head operation), the controller 180 can maintain video capture for the first region. Meanwhile, upon sensing a first or a second gesture input, a popup window displayed on the display unit 151 disappears.

Even when video capture for the first region is maintained as sensing the second gesture input, if the state of the first region being deviated from the view angle exceeds a predetermined period of time, then the controller 180 can display a popup window for inquiring whether or not to suspend video capture for the first region on the display unit 151.

Furthermore, even when video capture for the first region is suspended as sensing the first gesture input, if a predetermined condition (for example, the first region is located within the view angle or a capture signal is applied according to the user's manipulation) is satisfied, the controller 180 can resume the suspended video capture for the first region.

Figure 8:
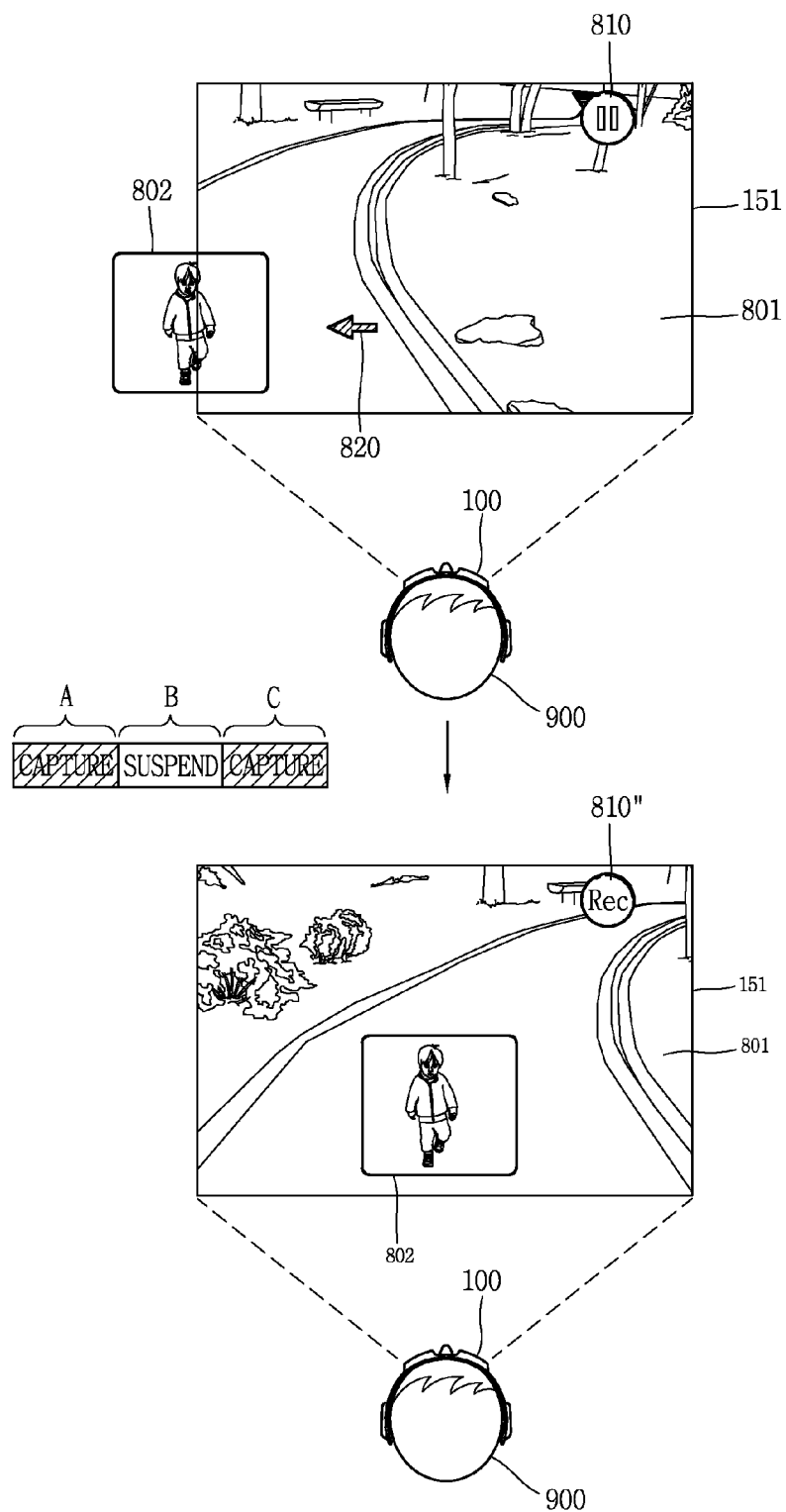
FIG. 8 is a conceptual view illustrating a processing method when a set region is contained again within a view angle in an image display device according to the examples of the present invention.

In this context, FIG. 8 is a conceptual view illustrating a processing method when a set region is contained again within a view angle in an image display device according to the examples of the present invention. When the first graphic object corresponding to the first region is displayed within the view angle again when video capture for the first region is suspended, the controller 180 controls to resume video capture for the first region and allow a second graphic object to disappear from the display unit 151.

That is, the controller 180 can capture only an image within the first region when the set first region exists within the view angle, and suspend capture when the first region is deviated from the view angle and subsequently perform capture when the first region appears again, thereby capturing only a user's desired scene. For example, when most of the set subject 802 is deviated from the view angle while capturing the subject 802 (A), capture is paused 810 (B) to display an image 820 indicating the location information of the subject. Meanwhile, when the subject inductor unit 802 is located again within the view angle, the subject is automatically captured in a subsequent manner (C). The captured video images are sequentially shown only for the captured portions (A, C).

In another example, the controller 180 can capture only an image within the first region when the set first region exists within the view angle, and capture the entire view angle when the first region is deviated from the view angle and then capture only an image within the first region when the first region is shown again within the view angle. In this instance, the capture video images are shown such that portions captured with the subject (A, C) and a portion that is not captured with the subject (B) are sequentially connected to each other (A, B, C).

Further, it is possible to change the first region while performing video capture for the first region or further set up another region in addition to the first region. When a gesture input for setting up a second region other than the first region when a first graphic object corresponding to the first region is displayed on the display unit 151, the controller 180 can replace video capture for the first region with video capture for the second region or change it to video capture for the first and the second region.

In this instance, the controller 180 can display a third graphic object (an image visually distinguished from the first graphic object corresponding to the first region) indicating the second region on the display unit 151. Video capture for the set first region may be terminated by a user's menu manipulation or when exceeding a predetermined period of time.

Figure 9A:
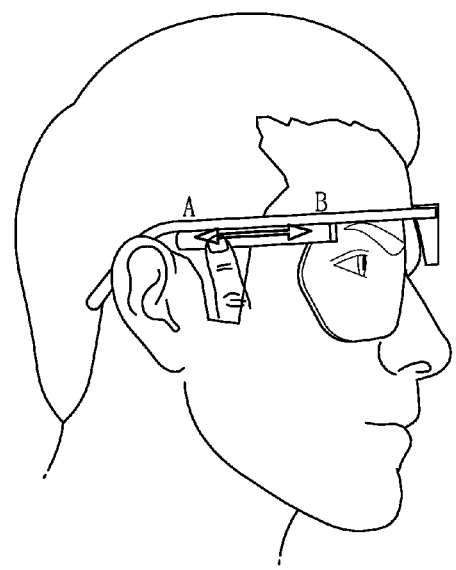
FIGS. 9A and 9B are conceptual views illustrating a method of editing undesired video images subsequent to the termination of video capture for a set region in an image display device according to an example of the present invention.
Figure 9B:
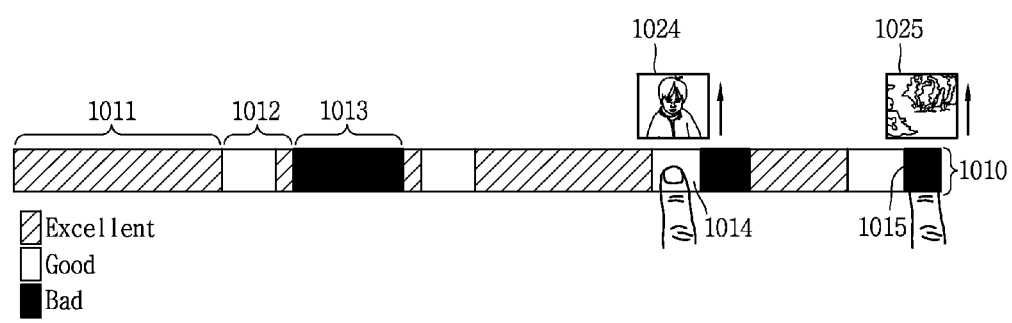

Hereinafter, a method of editing an undesired portion from captured video images when video capture for the first region is terminated will be described with reference to FIGS. 9A and 9B. In particular, FIGS. 9A and 9B are conceptual views illustrating a method of editing undesired video images subsequent to the termination of video capture for a set region in an image display device according to an example of the present invention.

While performing video capture for the first region, the controller 180 can continuously generate and store meta data associated with the first region. In addition, the meta data may include at least one of whether or not the set first region is contained in the view angle, location information when the first region is contained or not contained in the view angle, time information for which video capture for the first region is performed or not performed, and image quality information of the captured video images. In other words, the meta data may include location information and time information associated with the first region during the video capture for the first region.

When video capture for the first region is terminated, the user can enter an edit mode (or the execution of an edit function) of the video capture for the first region according to a menu manipulation of the image display device 100. When entering the edit mode, the controller 180 can display a first image object corresponding to meta data generated and stored during the video capture for the first region on the display unit 151.

In addition, the first image object may include a plurality of sections, and may include time information for which the first region is captured, section information in which capture for the first region is suspended or the entire view angle is captured. Furthermore, the first image object may include information on the quality (image quality status) of the captured image and information on a section in which only part of the first region is captured. In addition, the information may be displayed to be visually differentiated from the first image object (for example, displayed with different colors or different brightness levels).

For example, as illustrated in FIG. 9B, the entire length of the first image object 1010 may correspond to an entire period of time of video capture, and a plurality of sections may include specific information, and each color of the section may indicate a video capture state for the first region (for example, whether or not the first region is contained in the view angle and the extent of the first region contained in the first region, image quality state, etc.) For example, a first section 1011 denotes a section in which the capture state is excellent for the first region, a second section 1012 denotes a section in which the capture state is good, and a third section 1013 denotes a section in which the capture state is not good for the first region or the capture is not performed.

Furthermore, the first image object may include a larger number of images and information than that of actually captured video images. For example, the actually captured video images may include only video images for the first region, and the corresponding first image object may further include video images for the entire view angle along with video images for the first region.

Thus, when a first image object based on meta data generated during the video capture for the first region is displayed on the display unit 151, the user may edit actually captured video images through a predetermined gesture input for the first image object. Thus, a touch sensor capable of sensing a touch input may be provided in at least one region of the body 101 of the image display device 100. The controller 180 can control a first image object displayed on the display unit 151 to be scrolled according to the drag direction of a touch applied to the touch sensor, thereby retrieving a section desired for editing.

When the section desired for editing is shown on the display unit 151, the controller 180 can delete video images for the first region corresponding to the specific section in response to a gesture input in a predetermined direction being applied to a specific section (a section to be edited) of the first image object.

For example, referring to FIGS. 9A and 9B, when the user applies a drag touch input in a predetermined direction (direction A or B) to a specific position (a position provided with a touch sensor) of the body 101 as illustrated in FIG. 9A when the graphic object 1010 corresponding to meta data generated during the video capture for the first region is displayed on the display unit 151 (part of the entire image can be displayed on the display unit 151), the graphic object 1010 is scrolled along the drag direction to vary a range displayed on the display unit 151.

When sections 1014 and 1015 desired for editing are displayed on the display unit 151 and the user makes a touch to a specific section 1014, a representative frame 1024 of video images corresponding to the touched specific section 1014 is displayed nearby. When desired to delete the relevant section 1014, the user deletes the relevant section 1014 by making a flicking touch in a predetermined direction, for example, in an upward direction, and the deleted result is reflected on actually captured video images as they are. The user can also perform touch operations on the section 1015 to see and manipulate the frame 1025.

As described above, an image display device according to the present invention provides convenience capable of easily editing a user's undesired specific section using meta data visually displayed with time information when the captured region or object is deviated from the view angle subsequent to the termination of video capture for the set region or object.

Hereinafter, an embodiment in which the image display device 100 according to the present invention is connected to anther external device (for example, another image display device) through a wireless network to capture the set first region at the same time and integrate them into one will be described.

In this context, FIGS. 10A through 10D, 11A and 11B are conceptual views illustrating a method of performing video capture for a predetermined region along with another external device connected thereto in an image display device according to examples of the present invention. In addition, FIG. 12 is a conceptual view illustrating a method of merging undesired video images subsequent to the termination of video capture for a predetermined region by a plurality of devices in an image display device according to an example of the present invention.

The image display device 100 disclosed in the present invention may include the wireless communication unit 110 connected to another external device through a wireless network to transmit and receive a wireless signal. In addition, the wireless network may be at least one of a wireless personal area network, a wireless local area network, a wireless mesh network, a wireless metropolitan area network, a wireless wide area network, and a cellular network. Meanwhile, the types of wireless networks may not be necessarily limited to the foregoing examples.

Furthermore, the image display device 100 and another external device may communicate with each other using a 3G or 4G network. For example, the image display device 100 may transmit information to another external device using a 3G or 4G network. However, the present invention is not limited to this, the image display device 100 and another external device may communicate with each other by 2G or next generation communication methods.

In addition, the image display device 100 and another external device may communicate with each other using a personal area network (PAN). Meanwhile, a wireless personal area network (WPAN) may perform a PAN operation through wireless network technologies such as IrDA, wireless USB, Bluetooth, Z-Wave, ZigBee, or even Body Area Network. Furthermore, PAN may be performed through a wired computer bus such as USB and FireWire. Furthermore, a near field communication (NFC) mode may be also used as a type of PAN.

In addition to the foregoing technologies, the image display device 100 and another external device may be also connected to each other through at least one of Wi-Fi (Wireless-Fidelity), Wi-Fi Direct (Wireless-Fidelity Direct), and DLNA (Digital Living Network Alliance).

Further, the controller 180 can select a specific image displayed on the display unit 151 to select an external device to be accessed. Thus, the controller 180 can sense a multiple capture option selected with respect to the first region in a capture mode. The multiple capture option may be selected by manipulating a menu provided in the image display device 100.

Figure 10A:
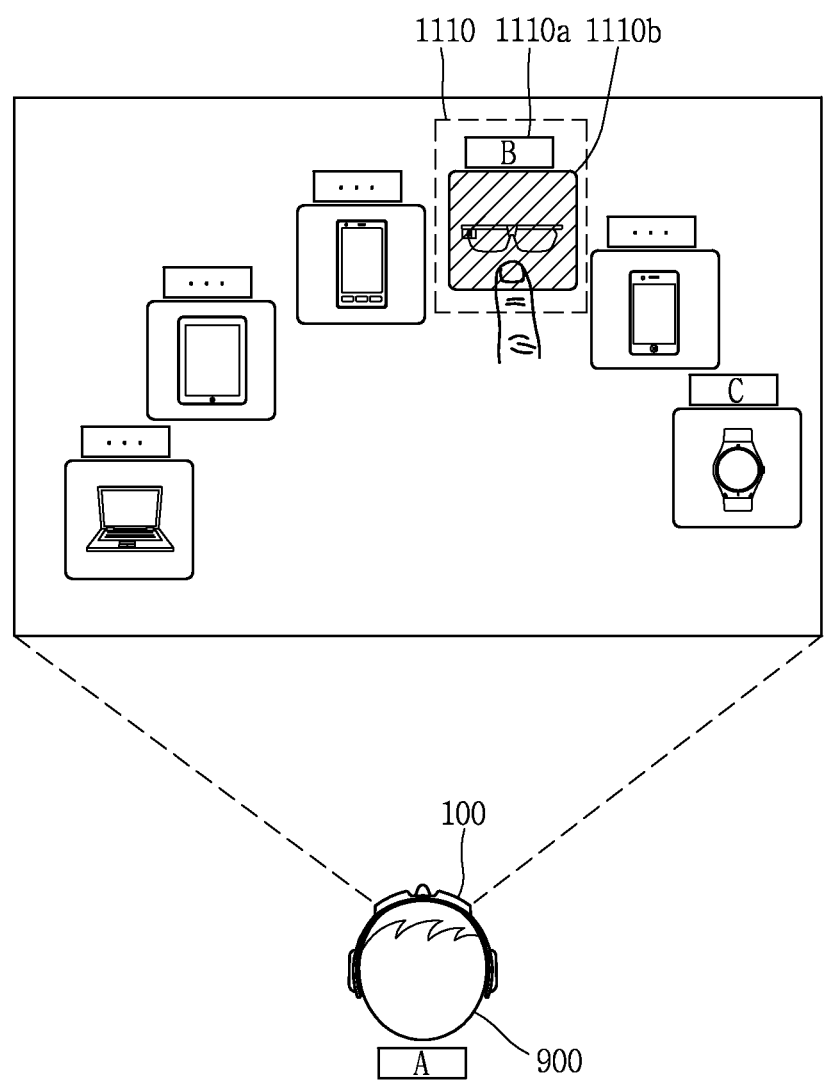
FIGS. 10A through 10D, 11A and 11B are conceptual views illustrating a method of performing video capture for a predetermined region along with another external device connected thereto in an image display device according to the examples of the present invention.

Thus, when a multiple capture option is selected, a list of representative images corresponding to at least one adjoining external device which is accessible to the image display device 100 is displayed on the display unit 151 as illustrated in FIG. 10A. In addition, the representative image 1110 may include a thumbnail image 1110*b* and user information 1110*a* corresponding to an accessible external device. The user wearing the image display device 100 performs a proximity touch to a specific representative image 1110 to select an external device to be accessed.

When a response signal is received from the external device 1110*b* corresponding to the selected representative image, it is connected to the responded external device 1110*b*. Next, the controller 180 can display the process of setting up a first region for video capture and the process of displaying a graphic object indicating the set first region which have been described in detail in the above. Next, when a capture signal is applied, the controller 180 transmits a control signal for performing video capture for the first region to the accessed external device.

When a control signal for instructing a capture to the accessed external device is transmitted, the controller 180 can further transmit a screen image corresponding to the set first region and location information for the first region to the accessed external device (hereinafter, referred to as a "second image display device"). In other words, the image display device 100 (A) that has set up a first region to be captured becomes a "master image display device", and a second image display device (B) for receiving information on the first region from the image display device 100 (A) to capture becomes a "slave image display device". In addition, a capture start time of the "master image display device" may be different from that of the "slave image display device".

Figure 10B:
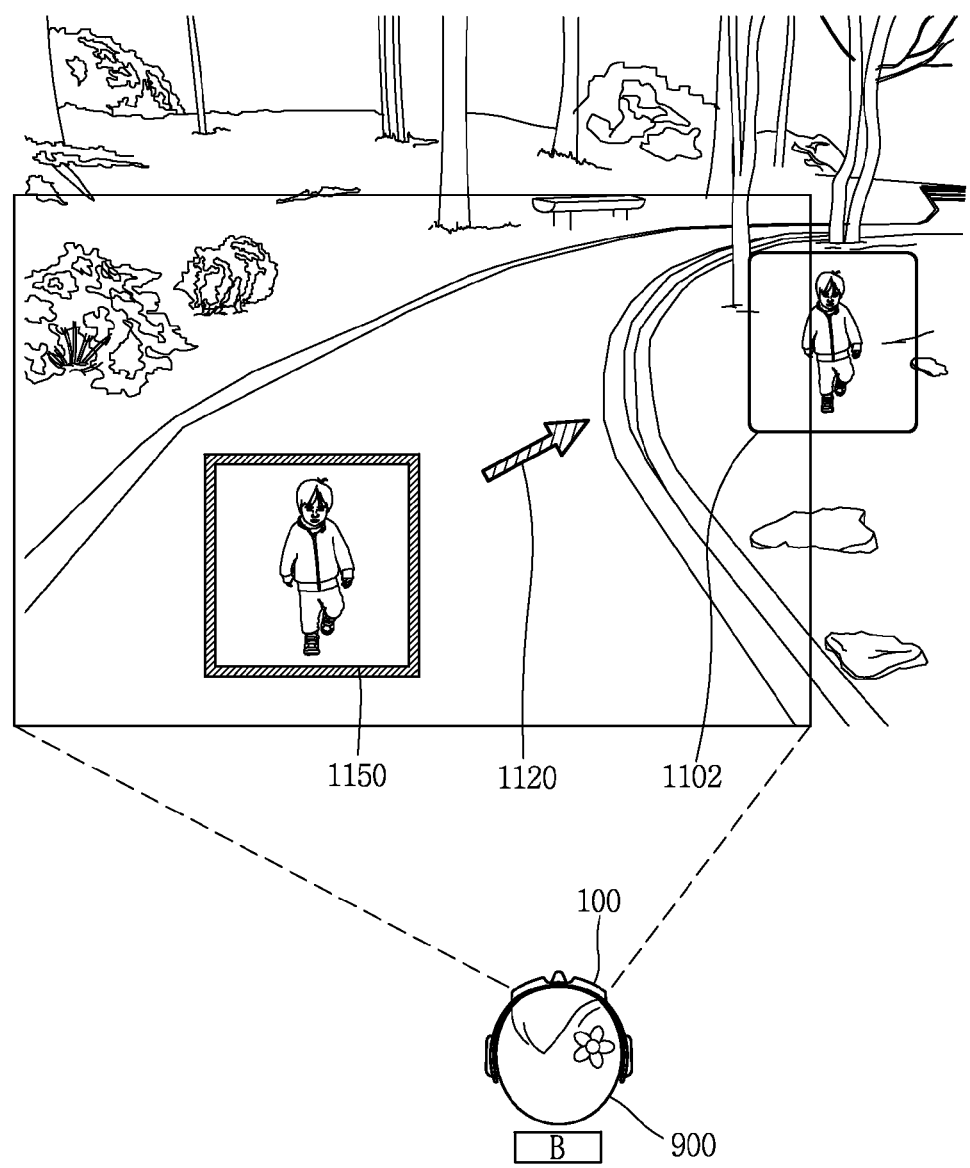

When at least part of the first region 1102 received from the first image display device 100 is deviated from a view angle of the second image display device (B) by more than a reference range (for example, 50%) as illustrated in FIG. 10B, a predetermined alarm is received from the second image display device (B). Accordingly, a first user wearing the image display device 100 (A) may recognize that a second user wearing the second image display device (B) does not properly capture the first region.

Further, an image 1150 for the first region received from the image display device 100 is displayed on the display unit 151 of the accessed second image display device (B), and an arrow shaped guide 1120 indicating the extent and direction of the first region 1102 being deviated from the view angle is displayed thereon. The setup, change, cancellation and the like of the first region may be performed only by the "master image display device".

Figure 10C:
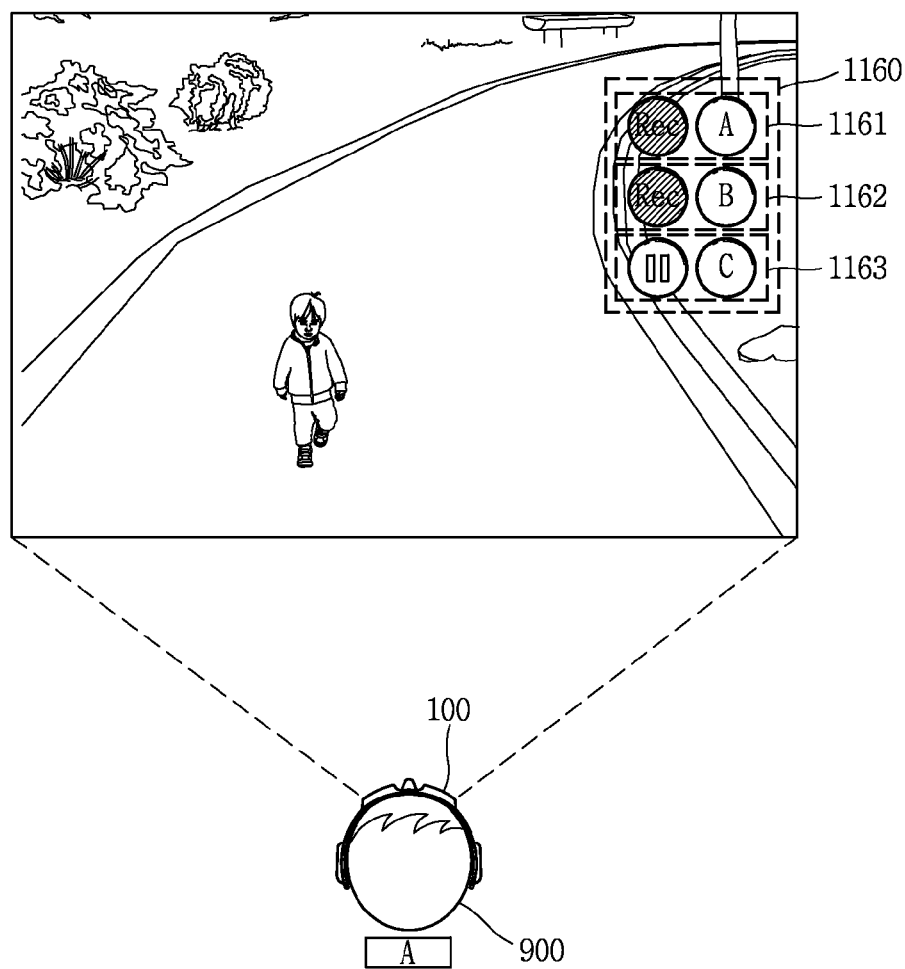
Figure 10D:
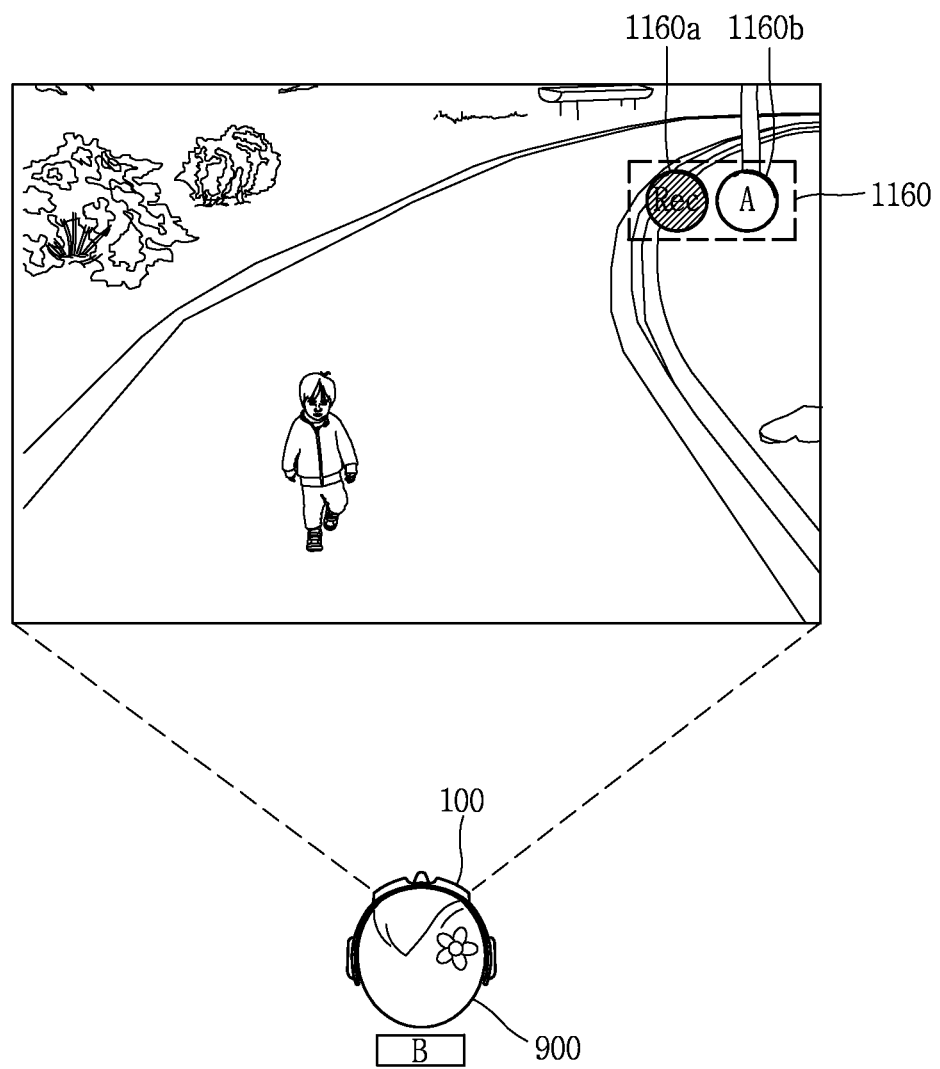

The "master image display device" (A) preferably recognizes capture status information for all accessed external devices, and thus a menu window 1160 indicating the information of the accessed each external device (A, B, C) and their capture state (being captured (REC), pause) is displayed in one region of the display unit 151 as illustrated in FIG. 10C. On the contrary, the "slave image display device" (B) connected to the "master image display device" (A) displays only device information 1160*b* on the accessed "master image display device" (A) and the capture status information 1160*a* on the display unit 151 as illustrated in FIG. 10D.

Figure 11A:
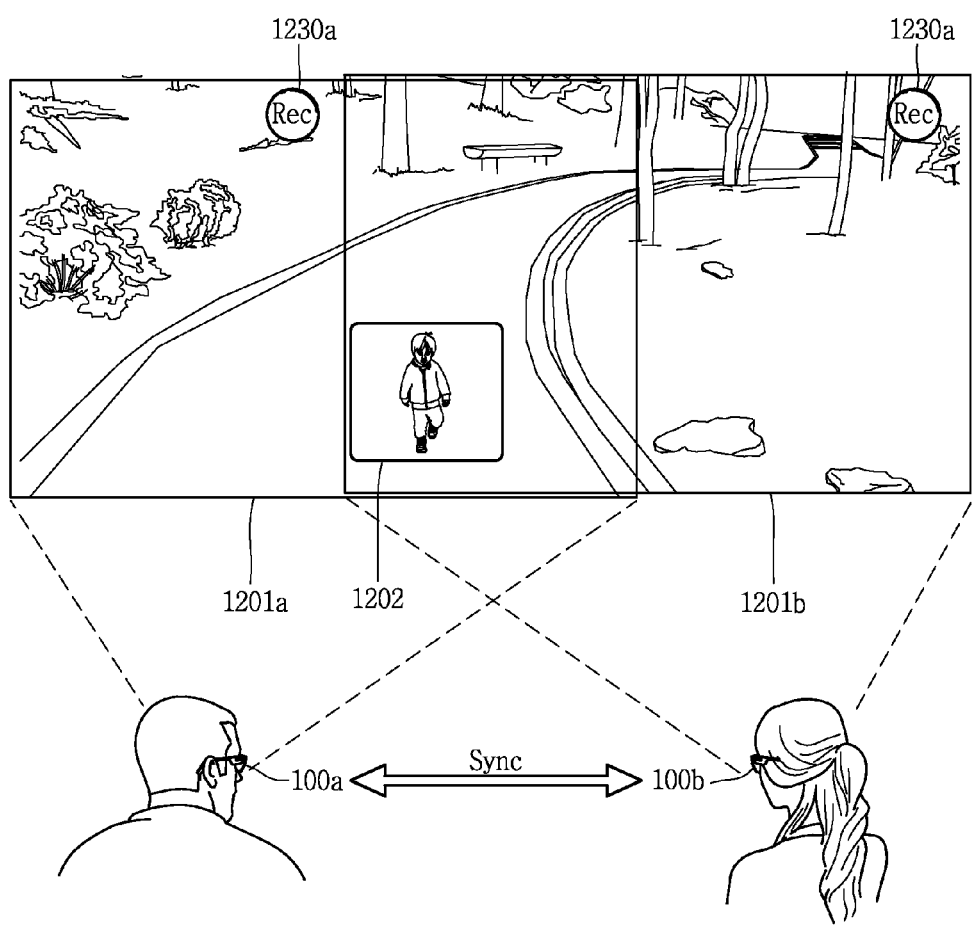
Figure 11B:
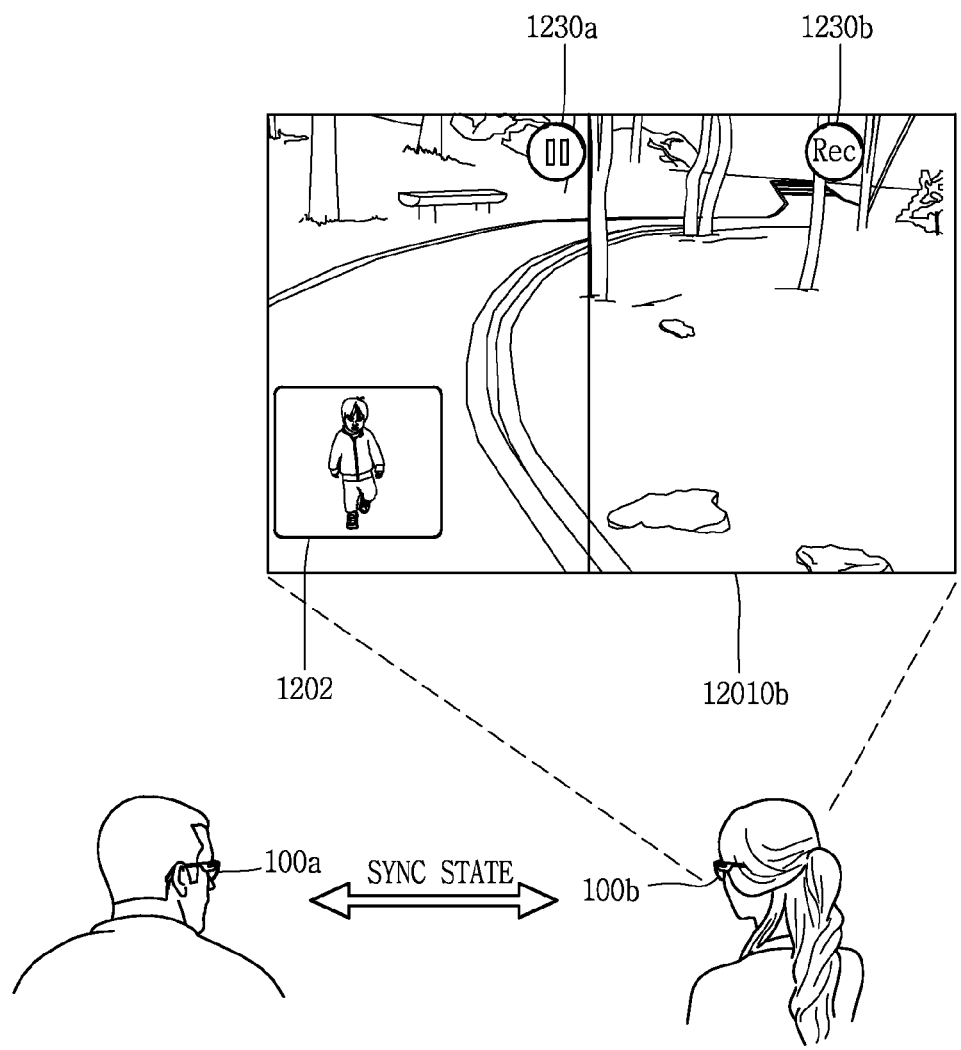
Figure 12:
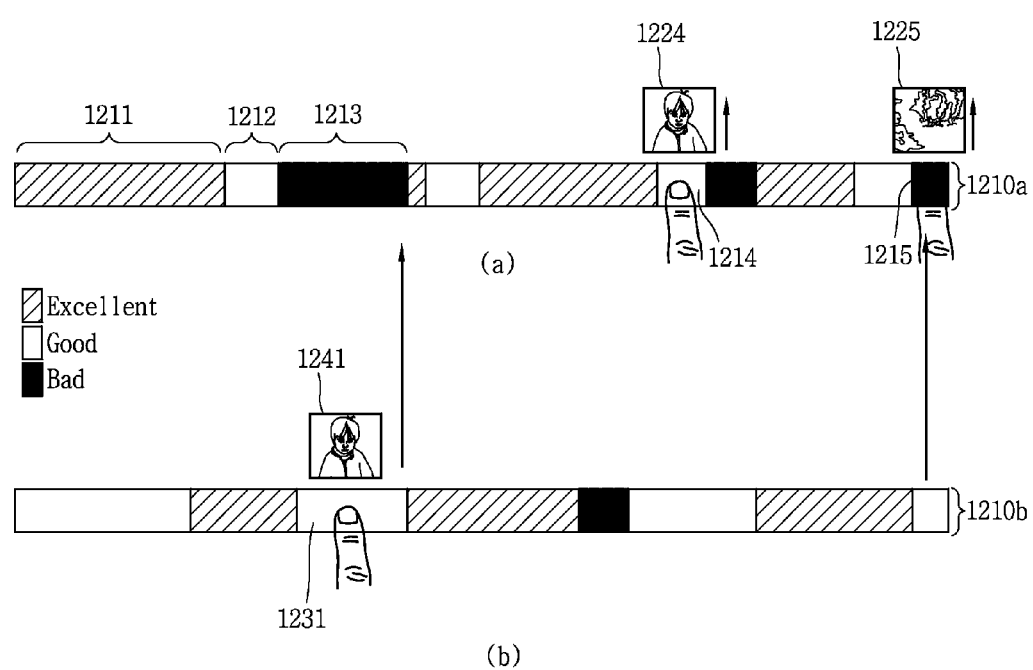
FIG. 12 is a conceptual view illustrating a method of merging undesired video images subsequent to the termination of video capture for a predetermined region by a plurality of devices in an image display device according to an example of the present invention.

Thus, while the "master image display device" (A) and at least one "slave image display device" (B) perform video capture for the first region, as illustrated in FIG. 11A, a subject 1202 set up by the "master image display device" 100*a* is continuously captured at the same angle or different angles as illustrated in FIG. 11A (for example, one continuously captures a front surface of the subject and the other continuously captures a lateral surface of the subject). During the capture, when video capture for the subject is paused by the "master image display device" 100*a*, the "slave image display device" 100*b* continues video capture for the subject, and even a capture state 1230*a* for the "master image display device" 100*a* is displayed on the display unit 151 of the "slave image display device" 100*b* as shown in FIG. 11B.

When video capture for the first region is terminated by a plurality of device as described above, the controller 180 of the "master image display device" collects first meta data generated from the body and second meta data generated from the "slave image display device".

In addition, the second meta data may include at least one of whether or not the first region is contained within the view angle and location information thereof, time information corresponding to whether or not to capture video for the first region in the accessed external device, and image quality information on the captured video image to store it in a memory during the video capture in the accessed external device.

The controller 180 generates a second image object similar to the foregoing first image object using the second meta data received from the accessed external device, namely, "slave image display device".

Next, when entering an edit mode for the video capture for the first region (or the execution of an edit function), the controller 180 can display a first image object corresponding to the first meta data generated during the video capture for the first region and a second image object corresponding to the second meta data received from the accessed "slave image display device" on the display unit 151.

As illustrated in FIG. 12, the second image object 1210*b* may include a plurality of sections similarly to the first image object 1210*a*, and may include time information for which the first region is captured, section information in which capture for the first region is suspended or the entire view angle is captured. Furthermore, the second image object may further include information on the quality (image quality status) of the captured image and information on a section in which only part of the first region is captured.

Furthermore, the information may be displayed to be visually differentiated from the second image object (for example, displayed with different colors or different brightness levels). For example, as illustrated in FIG. 12, the entire length of the second image object 1210*b* may correspond to an entire period of time of video capture, and a plurality of sections may include specific information, and each color of the section may indicate a video capture state for the first region (for example, whether or not the first region is contained in the view angle and the extent of the first region contained in the first region, image quality state, etc.)

Furthermore, the second image object may include a larger number of images and information than that of actually captured video images. For example, the actually captured video images may include only video images for the first region, and the corresponding second image object may further include video images for the entire view angle along with video images for the first region.

When the first and the second image object are displayed on the display unit 151 as described above, the user may edit actually captured video images through a predetermined gesture input to the first and the second image object. In addition, a plurality of sections displayed on the first and the second image object may be corresponding to each other or different from each other.

Thus, a touch sensor capable of sensing a touch input may be provided in at least one region of the body 101 of the image display device 100. The controller 180 can control a first image object or second image object displayed on the display unit 151 to be scrolled at the same time or individually according to the drag direction of a touch applied to the touch sensor, thereby retrieving a section desired for editing.

When the section desired for editing is shown on the display unit 151, the controller 180 can move video images for the first region corresponding to the specific section to the first image object in response to a gesture input in a predetermined direction being applied to a specific section (a section to be edited) of the second image object.

For example, referring to FIG. 12, when the user applies a drag touch input in a predetermined direction (direction A or B) to a specific position (a position provided with a touch sensor) of the body 101 when a first image object 1210a corresponding to first meta data generated during the video capture for the first region and a second image object 1210b corresponding to second meta data received from the "slave image display device" is displayed on the display unit 151, the first image object 1210a and/or second image object 1210b are scrolled along the drag direction to vary a range displayed on the display unit 151.

When sections 1213, 1231 desired for editing are displayed on the display unit 151 and the user makes a touch to a specific section 1231 of the second image object desired to be replaced, a representative frame 1241 of video images corresponding to the touched specific section 1231 is displayed at a nearby position, for example, at an upper side thereof. When the user makes a touch applied to the relevant section in a predetermined direction, for example, making a flicking touch in an upward direction, the section 1213 of the first image object corresponding to the relevant section 1231 is changed to video images corresponding to the touched section 1231. The image replaced result is reflected on actually captured video images as they are.

As described above, according to an image display device and a control method thereof according to an embodiment of the present invention, there is provided convenience capable of continuously capturing a specific region or object set up by the user using a display unit configured to be wearable on a specific portion of a user body. Accordingly, it may be possible to continuously capture a desired scene regardless of the user's motion or change in line-of-sight once the set specific region or object is contained in the view angle of the camera.

Furthermore, when the set specific region or object is deviated from a view angle of the camera, video capture for the set region or object is suspended to notify the current location of the set region or object to the user, thereby providing convenience capable of resuming capture for the desired region or object. Moreover, when video capture for the set region or object is terminated, there is provided convenience capable of editing a user's undesired specific section using meta data in which time information visually displayed with time information when the captured region or object is deviated from the view angle.

Moreover, according to an embodiment of the present invention, the foregoing method may be implemented as codes readable by a processor on a medium written by the program. Examples of the processor-readable media may include ROM, RAM, CD-ROM, magnetic tape, floppy disk, and optical data storage device, and the like, and also include a device implemented via a carrier wave (for example, transmission via the Internet). In addition, the configurations and methods according to the above-described embodiments will not be applicable in a limited way to the foregoing image display device and control method thereof, and all or part of each embodiment may be selectively combined and configured to make various modifications thereto.

What is claimed is:

1. An image display device, comprising:
   a body configured to be wearable on a specific portion of a human body;
   a camera coupled to the body and configured to capture a video;
   a display coupled to the body and configured to display a preview screen captured at a viewing angle of the camera; and
   a controller configured to:
      receive, on the display, a first input for setting a first region within the preview screen when the preview screen is displayed,
      display a first graphic object indicating the set first region on the preview screen,
      receive a capture signal,
      when the viewing angle of the preview screen including the set first region is included in a predetermined reference range, capture a video for the first region,
      when the viewing angle of the preview screen including the set first region deviates more than the predetermined reference range, suspend capturing the video for the first region and display a second graphic object indicating an extent of the deviation, and
   wherein the controller is further configured to:
      generate and store meta data associated with the first region, the metadata contains at least one of whether or not the first region is contained within the viewing angle and location information thereof, time information corresponding to whether or not to capture video for the first region, and image quality information on the captured video image while performing video capture for the first region, and
      display an image object corresponding to the stored meta data on the display when the video capture for the first region is terminated.

2. The image display device of claim 1, wherein the second graphic object indicates a direction the image display device should be moved to again to capture the set first region, and
   wherein the controller is further configured to adjust a length and direction of the second graphic object to correspond to a distance and direction of the first region being deviated from a center of the viewing angle.

3. The image display device of claim 1, wherein the first input for setting the first region on the preview screen includes a gesture input forming a closed curve shape, and
   wherein the controller is further configured to set the first region to correspond to the closed curve shape, and display the first graphic object corresponding to the closed curve shape on the display.

4. The image display device of claim 3, wherein the controller is further configured to:
   decrease a range of the first region in response to a narrowing gesture input for narrowing a boundary of the first graphic object in an inward direction, increase the range of the first region in response to a widening gesture input for widening the boundary of the first graphic object in an outward direction, and capture the entire viewing angle when the boundary is widened more than a predetermined amount.

5. The image display device of claim 3, wherein the controller is further configured to:
zoom in the first region in response to a zoom in gesture input moving the closed curve shape towards the first region and zoom out the first region in response to a zoom out gesture input moving the closed curve shape away from the first region.

6. The image display device of claim 1, wherein the controller is further configured to output an alarm when the set first region deviates more than the predetermined reference range or disappears from the display.

7. The image display device of claim 1, wherein the controller is further configured to capture the entire viewing angle or display a pop-up window for inquiring about suspending the capture of the video, when the set first region deviates more than the predetermined reference range or disappears from the display.

8. The image display device of claim 1, wherein the controller is further configured to:
resume video capture for the first region and stop displaying the second graphic object when the set first region is displayed again within the viewing angle when the capture of the video capture is suspended.

9. The image display device of claim 1, wherein the first region is a specific region within the preview screen or a specific object contained in the preview screen.

10. The image display device of claim 1, wherein the controller is further configured to:
receive a second input for changing the set first region to a second region on the preview screen,
capture the video for the second region instead of the first region based on the received second input, and
display a third graphic object indicating the second set region on the display.

11. The image display device of claim 1, wherein the controller is further configured to:
execute an edit function for the video capture when the image object is displayed and scroll the image object along the direction of dragging a touch applied to a touch sensor provided in one region of the body, and
delete video images for the first region corresponding to a specific section in response to a predetermined gesture to the specific section of the image object.

12. The image display device of claim 1, further comprising:
a wireless communication processor configured to wirelessly communicate with at least one external device, wherein the controller is further configured to:
display a representative image corresponding to the at least one external device when a multiple capture option for the first region is selected from the preview screen, and
transmit, through the wireless communication, a control signal for performing video capture for the first region to the at least one external device when the representative image is selected.

13. The image display device of claim 12, wherein the controller is further configured to:
transmit, through the wireless communication, a screen image corresponding to the first region and location information on the first region to the at least one external device, and
receive a predetermined alarm from the accessed external device when at least part of the first region is deviated from a viewing angle of the at least one external device by more than a reference range.

14. The image display device of claim 12, wherein when the capture of the video for the first region is terminated, the controller is further configured to:
receive, through the wireless communication, second meta data containing at least one of whether or not the first region is contained within the viewing angle of the at least one external device and location information thereof, time information corresponding to whether or not to capture video for the first region in the at least one external device, and image quality information on the captured video image in the at least one external device from the at least one external device.

15. The image display device of claim 12, wherein the body includes a touch sensor configured to sense a touch input provided in one region of the body, and
wherein the controller is further configured to:
display a first image object corresponding to first meta data and a second image object corresponding to second meta data received from the at least one external device on the display,
scroll either one of the first and the second image object along the direction of dragging a touch applied to the touch sensor when an edit function for the multiple capture is executed, and
replace video images corresponding to the first image object of a specific section with video images corresponding to the second image object of a corresponding specific section when a predetermined gesture is entered to the corresponding specific section of the second image object.

16. A method of controlling an image display device including a body configured to be wearable on a specific portion of a human body, a camera coupled to the body and configured to capture a video; and a display coupled to the body and configured to display a preview screen for capturing the video, the method comprising:
receiving, via a controller of the mobile terminal, a first input for setting a first region within the preview screen when the preview screen is displayed;
displaying, via the display, a first graphic object indicating the set first region on the preview screen;
receiving a capture signal;
capturing, via the camera, a video for the first region according to a capture signal, when the viewing angle of the preview screen including the set first region is included in a predetermined reference range;
suspending, via the controller, capturing the video for the first region and displaying a second graphic object indicating an extent of the deviation, when the viewing angle of the preview screen including the set first region deviates more than a predetermined reference range
generating and storing meta data associated with the first region, the metadata contains at least one of whether or not the first region is contained within the viewing angle and location information thereof, time information corresponding to whether or not to capture video for the first region and image quality information on the captured video image while performing video capture for the first region, and
displaying an image object corresponding to the stored meta data on the display when the video capture for the first region is terminated.

17. The method of claim 16, wherein the second graphic object indicates a direction the image display device should be moved to again to capture the set first region, and wherein the method further comprises adjusting a length and direction of the second graphic object to correspond to a distance and direction of the first region being deviated from a center of the viewing angle.

18. The method of claim 16, wherein the first input for setting the first region on the preview screen includes a gesture input forming a closed curve shape, and wherein the method further comprises setting the first region to correspond to the closed curve shape, and display the first graphic object corresponding to the closed curve shape on the display.

19. The method of claim 18, further comprising:

decreasing a range of the first region in response to a narrowing gesture input for narrowing a boundary of the first graphic object in an inward direction, increasing the range of the first region in response to a widening gesture input for widening the boundary of the first graphic object in an outward direction, and capturing the entire viewing angle when the boundary is widened more than a predetermined amount.

20. The method of claim 18, further comprising:

zooming in the first region in response to a zoom in gesture input moving the closed curve shape towards the first region and zooming out the first region in response to a zoom out gesture input moving the closed curve shape away from the first region.

\* \* \* \* \*